US010546136B2

(12) United States Patent
 Kanawa

(10) Patent No.: US 10,546,136 B2
(45) Date of Patent: Jan. 28, 2020

(54) DATA PROCESSOR, DATA MANAGEMENT SYSTEM, DATA PROCESSING METHOD, AND COMPUTER PROGRAM PRODUCT

(71) Applicants: KABUSHIKI KAISHA TOSHIBA, Minato-ku, Tokyo (JP); TOSHIBA SOLUTIONS CORPORATION, Minato-ku, Tokyo (JP)

(72) Inventor: Takuya Kanawa, Kanagawa (JP)

(73) Assignees: KABUSHIKI KAISHA TOSHIBA, Tokyo (JP); TOSHIBA SOLUTIONS CORPORATION, Tokyo (JP)

( * ) Notice: Subject to any disclaimer, the term of this patent is extended or adjusted under 35 U.S.C. 154(b) by 342 days.

(21) Appl. No.: 13/795,321

(22) Filed: Mar. 12, 2013

(65) Prior Publication Data
 US 2014/0081949 A1   Mar. 20, 2014

Related U.S. Application Data

(63) Continuation of application No. PCT/JP2012/074004, filed on Sep. 20, 2012.

(51) Int. Cl.
 *G06F 21/00* (2013.01)
 *G06F 21/60* (2013.01)
 (Continued)

(52) U.S. Cl.
 CPC .......... *G06F 21/60* (2013.01); *G06F 16/2454* (2019.01); *G06F 16/258* (2019.01);
 (Continued)

(58) Field of Classification Search
 CPC ............................ G06F 17/3046; G06F 19/24
 See application file for complete search history.

(56) References Cited

U.S. PATENT DOCUMENTS 4,853,962 A * 8/1989 Brockman ............ H04L 9/3236
   380/44
5,585,793 A * 12/1996 Antoshenkov .......... G06T 9/005
   341/106
(Continued)

FOREIGN PATENT DOCUMENTS

CN    1774755    5/2006
JP    64-036329   2/1989
(Continued)

OTHER PUBLICATIONS

Document Management System (Ricoh), JP 2002278970, Published: Sep. 27, 2002, inventors: Maeda Kaoru; Imasato Sho, http://search.proquest.com/professional/patents/results/14A44C46E4925D71276/1?accountid=161361.*

(Continued)

*Primary Examiner* — Mark D Featherstone
*Assistant Examiner* — Diedra McQuitery
(74) *Attorney, Agent, or Firm* — Amin, Turocy & Watson, LLP

(57) ABSTRACT

According to an embodiment, a data processor includes a storage unit that stores a set of character strings that is a set of character string elements of which magnitude correlation is uniquely identifiable; a data converter that encrypts numerical data included in data to be managed, generates an index value corresponding to the numerical data using the character string elements included in the set of character strings, and generates converted data including the encrypted numerical data and the index value; a first transmitting unit transmits the converted data to a server; a query expression converter that converts a condition part including a numerical value of a query expression into a condition part including the character string elements to generate a converted query expression; a second transmitting unit that transmits the converted query expression to the server; and (Continued)

a receiving unit that receives, from the server, a result of query.

9 Claims, 18 Drawing Sheets

(51) Int. Cl.
*G06F 16/2453* (2019.01)
*G06F 16/25* (2019.01)
*G09C 1/00* (2006.01)
*G06F 21/62* (2013.01)

(52) U.S. Cl.
CPC ............. *G06F 21/602* (2013.01); *G09C 1/00* (2013.01); *G06F 16/24534* (2019.01); *G06F 21/6209* (2013.01); *G06F 2211/007* (2013.01); *G06F 2212/402* (2013.01)

(56) References Cited

U.S. PATENT DOCUMENTS

| | | | |
|---|---|---|---|
| 8,131,721 B2 | 3/2012 | Kataoka et al. | |
| 2002/0156986 A1* | 10/2002 | Fujimura | 711/200 |
| 2002/0184251 A1* | 12/2002 | Ho | G06F 7/02 |
| 2004/0243816 A1* | 12/2004 | Hacigumus | H04L 9/0894 |
| | | | 713/193 |
| 2005/0251519 A1* | 11/2005 | Davis | G06F 7/02 |
| 2006/0041422 A1* | 2/2006 | Davis | G06F 17/275 |
| | | | 704/9 |
| 2006/0047671 A1* | 3/2006 | Meijer | G06F 9/454 |
| 2007/0106906 A1 | 5/2007 | Koike et al. | |
| 2007/0140563 A1* | 6/2007 | Kano et al. | 382/190 |
| 2008/0168431 A1* | 7/2008 | Ito et al. | 717/154 |
| 2008/0170693 A1* | 7/2008 | Spies | G06F 21/6209 |
| | | | 380/277 |
| 2009/0158054 A1* | 6/2009 | Dijk et al. | 713/189 |
| 2011/0167255 A1* | 7/2011 | Matzkel | H04L 63/0428 |
| | | | 713/153 |
| 2012/0324240 A1 | 12/2012 | Hattori et al. | |
| 2013/0287210 A1 | 10/2013 | Matsuda et al. | |

FOREIGN PATENT DOCUMENTS

| | | |
|---|---|---|
| JP | 2002-278970 | 9/2002 |
| JP | 2009-251748 | 10/2009 |
| JP | 4707198 | 3/2011 |
| WO | 2011/086668 A1 | 7/2011 |
| WO | 2012004880 | 1/2012 |
| WO | 2012/095973 | 7/2012 |

OTHER PUBLICATIONS

Document Management System (Ricoh), JP 2002278970, Published: Sep. 27, 2002, inventors: Maeda Kaoru; Imasato Sho, http://search.proquest.com/professional/patents/docview/1394906946/fulltextwithgraphics/.*
International Search Report for International Application No. PCT/JP2012/074004 dated Oct. 16, 2012, 1 pg.
Hore et al, A Privacy-Preserving Index for Range Queries, Proceedings of the 30th VLDB Conference, Toronto, Canada pp. 720-730.
Hakan et al, Executing SQL Over Encrypted Data in the Database-Service-Provider Model, ACM SIGMOD 2002 2002 Jun. 4-6.
International Search Report for PCT/JP2012/074004 dated Oct. 16, 2012.
Chinese Office Action for Chinese Patent Application No. 201280002836.4 dated Jun. 28, 2016.

* cited by examiner

FIG.4

EMPLOYEE TABLE
  ANNUAL INCOME: ENCRYPTED, INDEXED (→INDEX 1)
  AGE: ENCRYPTED

FIG.5

| EMPLOYEE ID | EMPLOYEE NAME | ANNUAL INCOME | AGE | INDEX 1 |
|---|---|---|---|---|
| 1 | TANAKA | sae3gs | t3sgre | ABCD |
| 2 | SATO | eggeed | ghgat | EFGD |

FIG.8

CASE 1: Pos=n IN ALL CIRCULATIONS

CIRCULATION 0  0-99
Pos=n $$\underbrace{\boxed{AB}_0 \;\; \boxed{ABCDEFG}_1 \;\; \boxed{ABD}_2 \;\; \boxed{BCDE}_3 \;\; \boxed{BCDF}_4 \;\; \cdots \;\; \boxed{ZZZ}_{99}}_{100}$$

CIRCULATION 1  100-199
Pos=n $\boxed{X}$ + $\boxed{AB}_{100} \;\; \boxed{ABCDEFG}_{101} \;\; \boxed{ABD}_{102} \;\; \boxed{BCDE}_{103} \;\; \boxed{BCDF}_{104} \;\; \cdots \;\; \boxed{ZZZ}_{199}$ CIRCULATION 2  200-299
Pos=n $\boxed{XX}$ + $\boxed{AB}_{200} \;\; \boxed{ABCDEFG}_{201} \;\; \boxed{ABD}_{202} \;\; \boxed{BCDE}_{203} \;\; \boxed{BCDF}_{204} \;\; \cdots \;\; \boxed{ZZZ}_{299}$

CASE 2: DEFINE Pos PER EACH CIRCULATION

CIRCULATION 0  0-99
Pos=n $$\underbrace{\boxed{AB}_0 \;\; \boxed{ABCDEFG}_1 \;\; \boxed{ABD}_2 \;\; \boxed{BCDE}_3 \;\; \boxed{BCDF}_4 \;\; \cdots \;\; \boxed{ZZZ}_{99}}_{100}$$

CIRCULATION 1  100-149
Pos=2n $\boxed{X}$ + $\boxed{AB}_{100} \;\; \boxed{ABCDEFG}_{101} \;\; \boxed{ABD}_{101} \;\; \boxed{BCDE}_{153} \;\; \boxed{BCDF}_{102} \;\; \cdots \;\; \boxed{ZZZ}_{149}$ CIRCULATION 2  150-249
Pos=n $\boxed{XX}$ + $\boxed{AB}_{150} \;\; \boxed{ABCDEFG}_{151} \;\; \boxed{ABD}_{152} \;\; \boxed{BCDE}_{153} \;\; \boxed{BCDF}_{154} \;\; \cdots \;\; \boxed{ZZZ}_{249}$

FIG.11
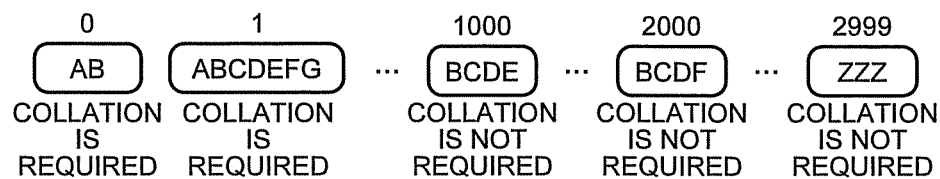
CIRCULATION 0: [0-999]: Pos=3n, COLLATION IS NOT REQUIRED
CIRCULATION 1: [1000-1999]: Pos=3n, COLLATION IS REQUIRED
CIRCULATION 2: [2000-4999]: Pos=n, COLLATION IS NOT REQUIRED
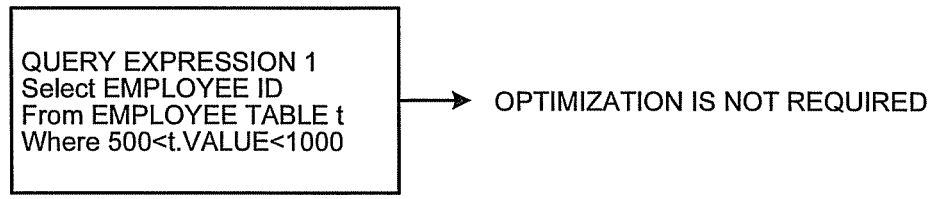
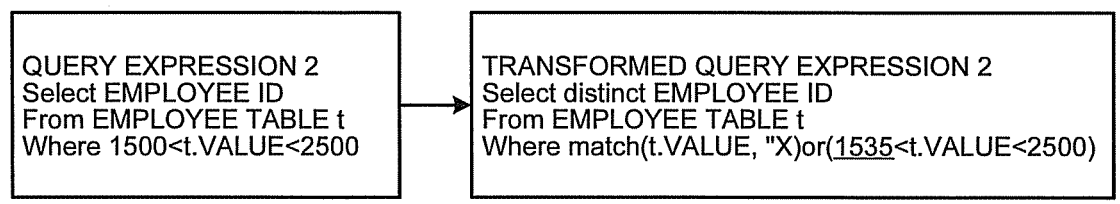

FIG.13

Select EMPLOYEE ID
From EMPLOYEE TABLE
Where VALUE>"XYZA" collate "collation1"

Select MAX (VALUE, "collation1")
From EMPLOYEE TABLE

FIG.15

Select EMPLOYEE ID
From EMPLOYEE TABLE
Where VALUE>"XYZA" collate "http://www.toshiba.co.jp/collation1"

Select MAX (VALUE, "http://www.toshiba.co.jp/collation1")
From EMPLOYEE TABLE

FIG.16
(a) FIRST EXAMPLE
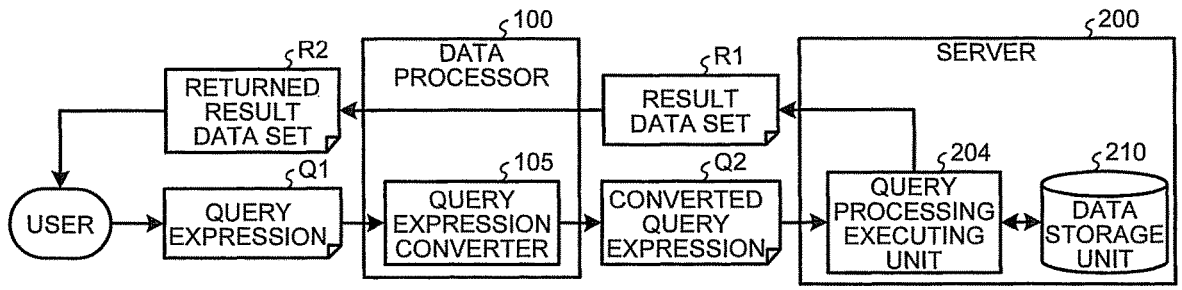
(b) SECOND EXAMPLE
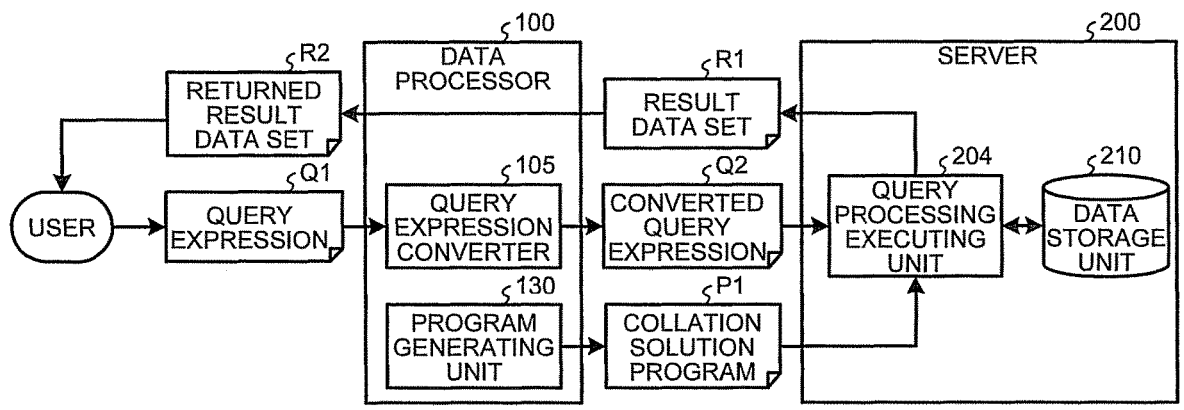
(c) THIRD EXAMPLE
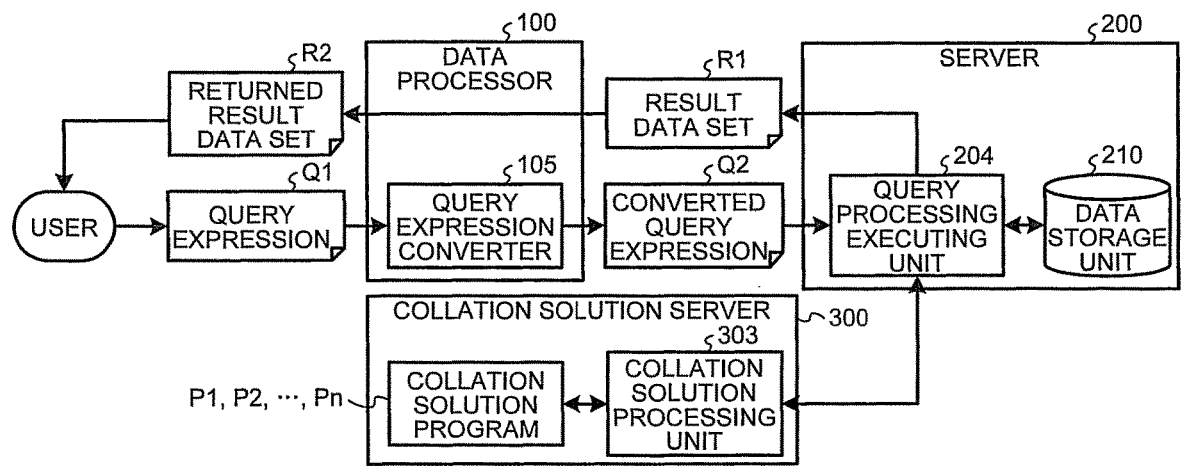
(d) FOURTH EXAMPLE
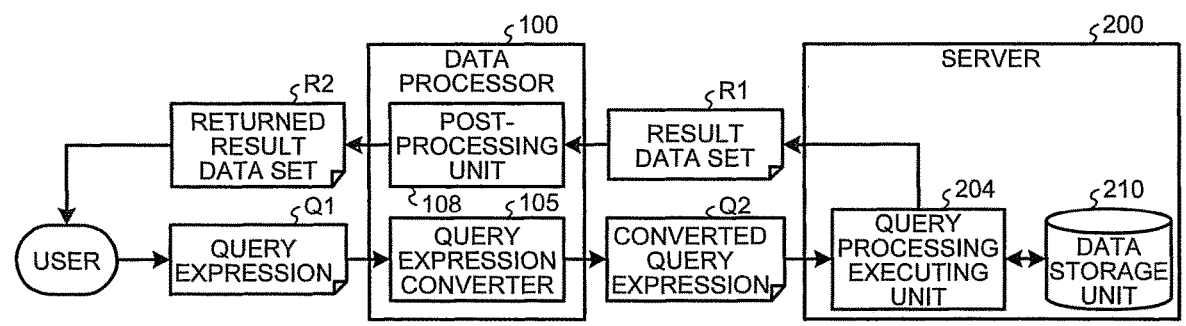

FIG.18

CONVERTED QUERY EXPRESSION 1
Select EMPLOYEE ID
From EMPLOYEE TABLE
Where "XBCDF"<VALUE<"XXABD"
Order By VALUE

CONVERTED QUERY EXPRESSION 2
Select EMPLOYEE ID
From EMPLOYEE TABLE
Where "XBCDF"<VALUE<"XJKLM"
Or("XJKLM"≦VALUE<"XXAB" collate "collation1")
Or("XXAB"≦VALUE<"XXABD")
Order By VALUE collate "collation1"

CONVERTED QUERY EXPRESSION 3
Select EMPLOYEE ID
From EMPLOYEE TABLE
Where "XBCDF"<VALUE<"XJKLM"
Or("XJKLM"≦VALUE<"XXAB" collate "http://www.toshiba.co.jp/collation1")
Or("XXAB"≦VALUE<"XXABD")
Order By VALUE collate "http://www.toshiba.co.jp/collation1"

CONVERTED QUERY EXPRESSION 4

4-1
```
Select*
From EMPLOYEE TABLE
Where match(VALUE,"X")Or("XXAB"≦VALUE<"XXABD") → PRIMARY RESULT SET
Order By VALUE
```

4-2
Select EMPLOYEE ID
From PRIMARY RESULT SET
Where "XBCDF"<VALUE<"XXABD" collate "collation1"
Order By VALUE collate "collation1"

DATA PROCESSOR, DATA MANAGEMENT SYSTEM, DATA PROCESSING METHOD, AND COMPUTER PROGRAM PRODUCT

CROSS-REFERENCE TO RELATED APPLICATIONS

This application is a continuation of PCT international application Ser. No. PCT/JP2012/074004 filed on Sep. 20, 2012 which designates the United States, incorporated herein by reference, the entire contents of which are incorporated herein by reference.

FIELD

Embodiments described herein relate generally to a data processor, a data management system, a data processing method, and a computer program product.

BACKGROUND

In recent years, a DaaS (Database as a Service) that provides a usage environment of a database via the Internet has been getting attention as a form of cloud computing service. Users of the DaaS can reduce cost and unify management by devolving a permanent management job of data owned by themselves and a general database management job to a service provider. However, an administrator of a database server provided by the service provider (hereinafter, simply referred to as a server) is often a third party different from a user enjoying the service (hereinafter, referred to as a client), so that it is not ensured to completely prevent information leakage even if the third party provides a database encryption service. Because of a risk of security attack by the third party, there is an increasing need to prevent raw data itself before encryption from being viewed by a database administrator.

Thus, a method for enhancing security by transferring data to be managed to a server after encrypted on a client side and causing the server to manage the encrypted data has been proposed. However, it is difficult to directly search on the encrypted data, so that it is necessary to perform procedures as follows: once sending data on the server side to the client, decoding the data on the client side, and perform result collation as to whether an original query condition is satisfied. Under such circumstances, there is a problem that the client can hardly enjoy search service of a database, a burden on the client is large, and a processing time becomes very long. To solve the problems as described above, some methods for managing the encrypted data so as to be searchable in the server has been proposed. However, it is particularly difficult for these conventional methods to perform search such as range search of numerical data with high efficiency while high security is maintained, so that improvement has been demanded.

BRIEF DESCRIPTION OF THE DRAWINGS

FIG. 4 is a diagram illustrating an example of encryption/indexing target information;

FIG. 5 is a diagram illustrating an example of converted data to be managed that is generated using the encryption/indexing target information illustrated in FIG. 4;

FIG. 8 is a schematic diagram conceptually illustrating an example of processing in which an allocation determining unit for character string elements allocates a character string element and an index value generating unit generates an index value;

FIG. 11 is a schematic diagram conceptually illustrating an example of processing to optimize a condition part of the query expression using auxiliary information;

FIG. 13 is a diagram illustrating an example of a converted query expression to which a collate notation is added;

FIG. 15 is a diagram illustrating an example of a converted query expression in which a collation solution program used for collation solution is embedded using a Uniform Resource Identifier (URI) expression;

FIG. 16 is a schematic diagram describing outlines of a first to fourth examples;

FIG. 18 is a diagram illustrating converted query expressions generated by a query expression converter of a data processor in the first to fourth examples.

DETAILED DESCRIPTION

According to an embodiment, a data processor includes a storage unit, a data converter, a first transmitting unit, a query expression converter, a second transmitting unit, and a receiving unit. The storage unit stores therein a set of character strings that is a set of a plurality of character string elements of which magnitude correlation is uniquely identifiable. The data converter encrypts numerical data included in data to be managed, generates an index value corresponding to the numerical data using the character string elements included in the set of character strings, and generates converted data to be managed including the encrypted numerical data and the index value. The first transmitting unit transmits the converted data to be managed to a server. The query expression converter converts a condition part including a numerical value of a query expression into a condition part including the character string elements included in the set of character strings to generate a converted query expression. The second transmitting unit transmits the converted query expression to the server. The receiving unit receives, from the server, a result of query processing executed using the converted query expression.

Hereinafter, a data processor, a data management system, a data processing method, and a computer program of embodiments will be described with reference to the appended drawings.

First Embodiment

Figure 1:
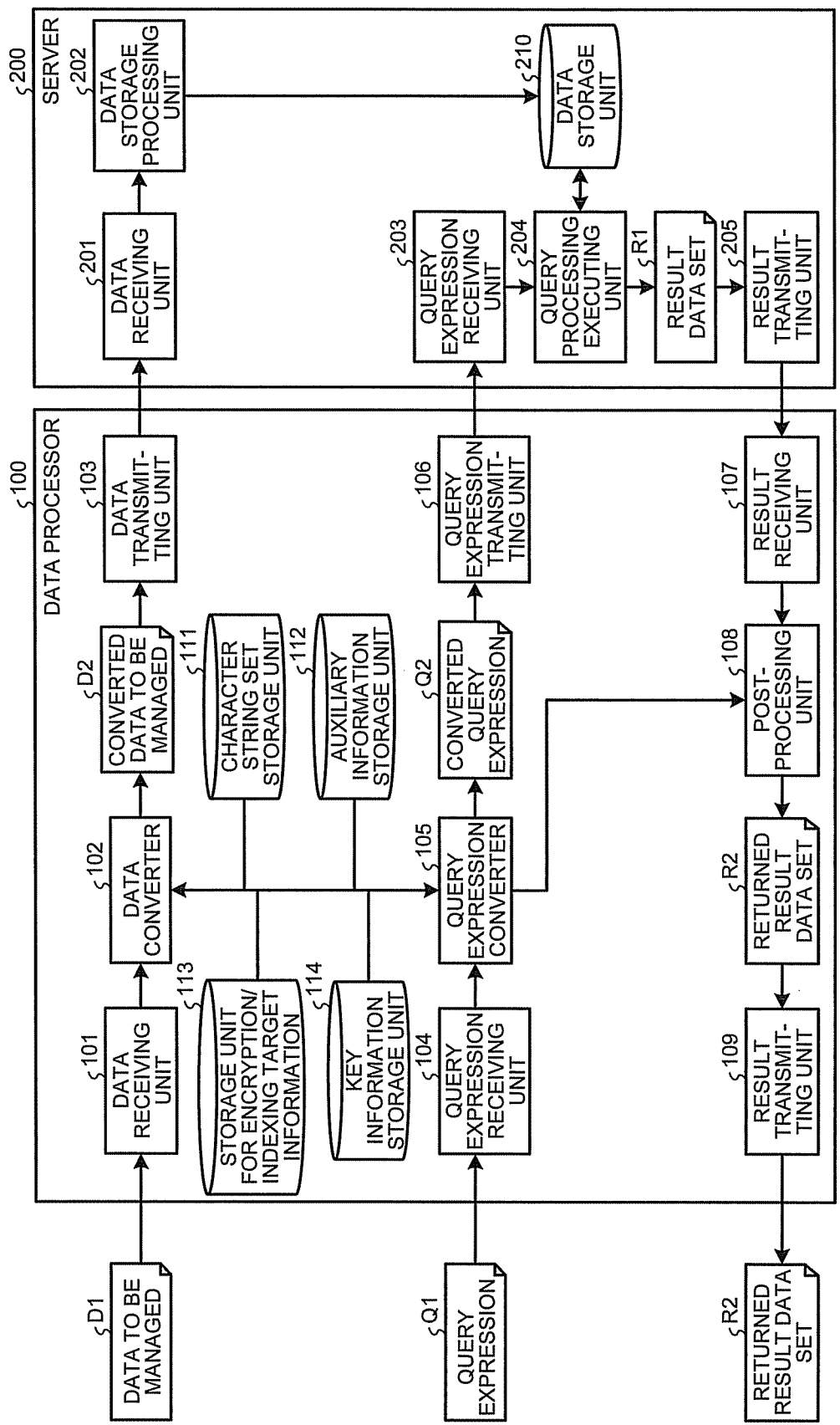
FIG. 1 is a block diagram illustrating an entire configuration of a data management system according to a first embodiment.

FIG. 1 is a block diagram illustrating an entire configuration of a data management system according to a first embodiment. The data management system is, for example, a system realized by a service provider providing a DaaS, and includes a data processor 100 and a server 200. The data processor 100 performs processing such as encryption of data to be managed that is registered to the server 200, generation of an index value, and conversion of a query expression. The server 200 has a role in realizing general database processing functions such as storage of data to be managed sent from the data processor 100 and query processing. The data processor 100 and the server 200 are configured to be separated from each other and communicatively connected with each other via a network. The data processor 100 and the server 200 are managed by different administrators.

Before description of specific configurations of the data processor 100 and the server 200 constituting the data management system according to the present embodiment, specific examples of an expression form of data to be managed that is registered to the server 200, a corresponding form of database of the server 200, and a query expression form to the database will be described. Hereinafter, exemplified is a case where an employee table including an employee ID, an employee name, annual income, and age in one record is registered to the server 200 as data to be managed.

Figure 2:
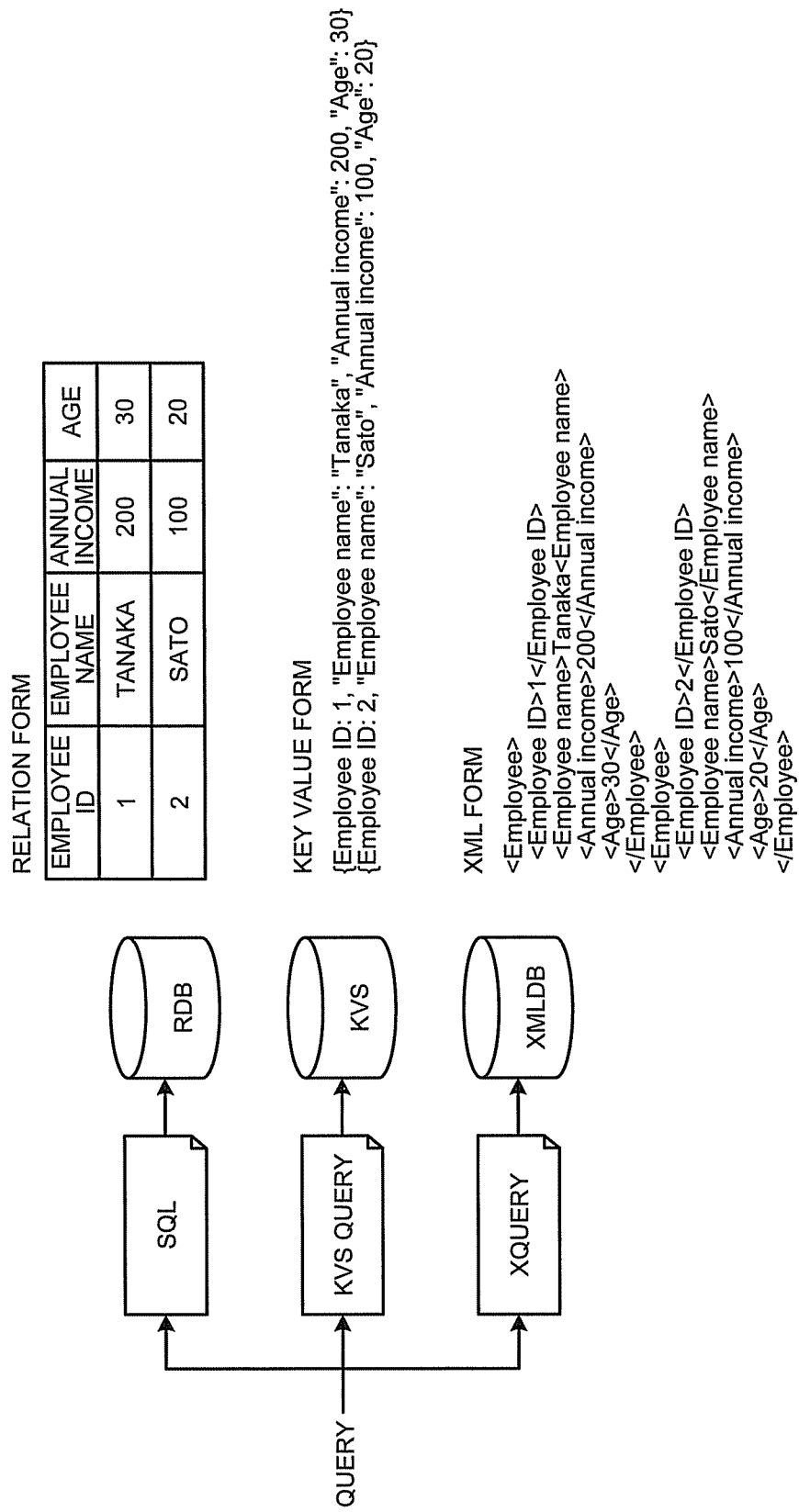
FIG. 2 is a diagram illustrating a correspondence among an expression form of data to be managed, a form of a database, and a form of a query expression.

FIG. 2 is a diagram illustrating correspondence among an expression form of data to be managed, a form of a database, and a form of a query expression. As illustrated in FIG. 2, various forms such as a relation form, a key value form, and an Extensible Markup Language (XML) form can be considered as the expression form of the data to be managed, and there are corresponding suitable forms of database. For example, a relational database (RDB) is suitable for the relation form, a key value store (KVS) is suitable for the key value form, and an XML database (XMLDB) is suitable for the XML form. The form of the query expression also varies depending on the form of the database. The query expression to the relational database is described by SQL, the query expression to the key value store is described by a KVS query, and the query expression to the XML database is described by XQUERY.

The data management system according to the embodiment handles data expressed by a pair of a key and a value as data to be managed, such as <column name, value> in the relation form, <key name, value> in the key value form, and <element (property) name, value> in the XML form. The form of the database managed by the server 200 and the form of the query expression to the database correspond to the expression form of the data to be managed.

Next, a configuration of the data processor 100 will be described. As illustrated in FIG. 1, the data processor 100 includes, as functional components, a data receiving unit 101, a data converter 102, a data transmitting unit 103, a query expression receiving unit 104, a query expression converter 105, a query expression transmitting unit 106, a result receiving unit 107, a post-processing unit 108, and a result transmitting unit 109. In addition, the data processor 100 includes a character string set storage unit 111, an auxiliary information storage unit 112, a storage unit for encryption/indexing target information 113, and a key information storage unit 114 as information resources used for processing in the data converter 102 or the query expression converter 105.

The data receiving unit 101 receives data to be managed D1 sent by, for example, a user of the DaaS or the like (hereinafter, referred to as a user).

The data converter 102 performs encryption processing and generates index values of the data to be managed D1 received by the data receiving unit 101 to generate converted data to be managed D2, by using a set of character strings stored in the character string set storage unit 111, auxiliary information stored in the auxiliary information storage unit 112, encryption/indexing target information stored in the storage unit for encryption/indexing target information 113, and key information stored in the key information storage unit 114. Details of processing by the data converter 102 will be described later.

The data transmitting unit 103 transmits the converted data to be managed D2 generated by the data converter 102 to the server 200 along with a registration request.

The query expression receiving unit 104 receives a query expression Q1 sent by the user.

The query expression converter 105 replaces numerical data of a condition part (a part in which the condition is designated) of the query expression Q1 received by the query expression receiving unit 104 with a character string element to generate a converted query expression Q2, using the set of character strings stored in the character string set storage unit 111 and the auxiliary information stored in the auxiliary information storage unit 112. Details of processing by the query expression converter 105 will be described later.

The query expression transmitting unit 106 transmits the converted query expression Q2 generated by the query expression converter 105 to the server 200.

The result receiving unit 107 receives a result data set R1 resulting from query processing by the server 200 using the converted query expression Q2.

The post-processing unit 108 converts the result data set R1 received by the result receiving unit 107, that is, the result data set R1 resulting from the query processing executed using the converted query expression to adapt to the request of the original query expression Q1 prior to the conversion as necessary, and generates a returned result data set R2. In this case, if the result data set R1 received by the result receiving unit 107 includes encrypted numerical data, the post-processing unit 108 decrypts the numerical data using the key information stored in the key information storage unit 114 and generates the returned result data set R2.

The result transmitting unit 109 transmits the returned result data set R2 generated by the post-processing unit 108 to the user who has transmitted the query expression Q1.

Next, a configuration of the server 200 will be described. As illustrated in FIG. 1, the server 200 includes a data receiving unit 201, a data storage processing unit 202, a query expression receiving unit 203, a query processing executing unit 204, and a result transmitting unit 205 as functional components. In addition, the server 200 includes a data storage unit 210 functioning as a database.

The data receiving unit 201 receives the converted data to be managed D2 transmitted from the data processor 100 along with the registration request.

The data storage processing unit 202 stores therein the converted data to be managed D2 received by the data receiving unit 201 in the data storage unit 210 in response to the registration request from the data processor 100.

The query expression receiving unit 203 receives the converted query expression Q2 transmitted from the data processor 100.

The query processing executing unit 204 executes the query processing with respect to the data storage unit 210 using the converted query expression Q2 received by the query expression receiving unit 203, and acquires the result data set R1.

The result transmitting unit 205 transmits the result data set R1 acquired by the query processing executing unit 204 as a result of the query processing executed using the converted query expression Q2 to the data processor 100.

Next, an outline of the operation in the data management system according to the embodiment will be described. The operation at the time of data registration will be described first.

The user sends the data to be managed D1 that is desired to be permanently managed by the server 200 to the data processor 100. The data to be managed D1 sent from the user to the data processor 100 is received by the data receiving unit 101 of the data processor 100, and transmitted to the data converter 102.

When receiving the data to be managed D1 transmitted from the data receiving unit 101, the data converter 102 refers to the encryption/indexing target information stored in the storage unit for encryption/indexing target information 113 to specify numerical data to be encrypted and numerical data from which an index value is generated, both of which are included in the data to be managed D1. The data converter 102 encrypts the specified numerical data to be encrypted using the key information stored in the key information storage unit 114 and generates an index value corresponding to the numerical data among the encrypted numerical data from which the index value is generated.

In the embodiment, when the data converter 102 generates the index value, the set of character strings stored in the character string set storage unit 111 and the auxiliary information stored in the auxiliary information storage unit 112 are used. The set of character strings is a set of a plurality of character string elements of which magnitude correlation is uniquely identified. The set of character strings is constructed in advance according to a collation rule and stored in the character string set storage unit 111. The auxiliary information is information required for generating the index value using the character string elements. The auxiliary information is, for example, information such as a rule for a case where a finite number of character string elements constituting the set of character strings is circularly used, and an allocation rule for a case where the character string elements are allocated to numerical values. The data converter 102 specifies, based on the auxiliary information, the character string element corresponding to the numerical data from which the index value is generated from among a plurality of character string elements included in the set of character strings, and generates the index value corresponding to the encrypted numerical data by using the specified character string element. The data converter 102 generates the converted data to be managed D2 including the encrypted numerical data and the index value.

The converted data to be managed D2 generated by the data converter 102 is transmitted from the data transmitting unit 103 to the server 200, received by the data receiving unit 201 of the server 200, and transmitted to the data storage processing unit 202. The data storage processing unit 202 directly stores the converted data to be managed D2 received by the data receiving unit 201 in the data storage unit 210 without special processing.

Next, operation at the time of data search using the query expression will be described. In the data management system of the embodiment, a query by the user is not directly performed to the server 200 but to the data processor 100.

The user sends the query expression Q1 for causing the server 200 to execute the query processing to the data processor 100. The query expression Q1 sent by the user to the data processor 100 is received by the query expression receiving unit 104 of the data processor 100, and transmitted to the query expression converter 105.

When the query expression receiving unit 104 transmits the query expression Q1, the query expression converter 105 generates, based on the query expression Q1, the converted query expression Q2 that can perform search with the index value generated at the time of data registration. Specifically, the query expression converter 105 converts, using the set of character strings stored in the character string set storage unit 111 and the auxiliary information stored in the auxiliary information storage unit 112, the condition part including the numerical value of the query expression Q1 into the condition part including the character string elements included in the set of character strings to generate the converted query expression Q2.

The converted query expression Q2 generated by the query expression converter 105 is transmitted from the query expression transmitting unit 106 to the server 200, received by the query expression receiving unit 203 of the server 200, and transmitted to the query processing executing unit 204. The query processing executing unit 204 directly uses the converted query expression Q2 received by the query expression receiving unit 203 to execute the query processing with respect to the data storage unit 210, and acquires the result data set R1 adapted to the condition part of the converted query expression Q2.

The result data set R1 acquired by the query processing executing unit 204 is transmitted from the result transmitting unit 205 to the data processor 100, received by the result receiving unit 107 of the data processor 100, and transmitted to the post-processing unit 108. The post-processing unit 108 converts the result data set R1 received by the result receiving unit 107 to adapt to the request of the original query expression Q1 as necessary, and generates the returned result data set R2. The returned result data set R2 generated by the post-processing unit 108 is returned to the user from the result transmitting unit 109 as a search result of the query expression Q1.

As described above, in the data management system according to the embodiment, the data processor 100 encrypts the numerical data desired to be concealed and included in the data to be managed D1, generates the converted data to be managed D2 with the index value corresponding to the encrypted numerical data added thereto, and stores the converted data to be managed D2 in the data storage unit 210 of the server 200. The data processor 100 converts the query expression Q1 issued by the user into the converted query expression Q2 that can perform search with the index value. The server 200 executes the query processing with respect to the data storage unit 210 using the converted query expression Q2 and transmits the result data set R1 resulting from the query processing to the data processor 100. The data processor 100 converts the result data set R1 to adapt to the request of the query expression Q1 as necessary, generates the returned result data set R2, and returns the returned result data set R2 to the user as a result of the query expression Q1. Thus, under the data management system of the embodiment, the server 200 may directly execute operations on the encrypted numerical data, for example, operations on syntaxes that require rapidity such as range search, MAX/MIN processing, join processing, and sort processing on the numerical data. In this manner, high-performance search may be achieved while high security is maintained.

Figure 3:
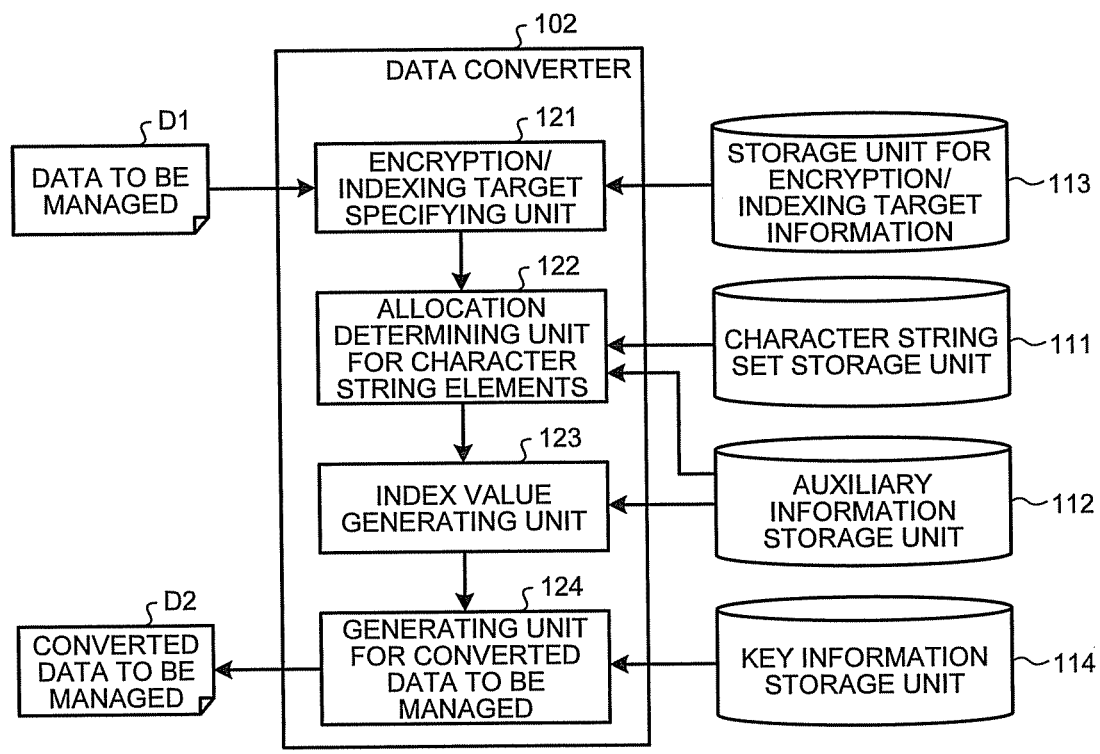
FIG. 3 is a block diagram illustrating an example of a specific configuration of a data converter.

Next, the data converter 102 included in the data processor 100 will be further described in greater detail while specific examples of processing are being exemplified. FIG. 3 is a block diagram illustrating an example of a specific configuration of the data converter 102.

As illustrated in FIG. 3, the data converter 102 includes an encryption/indexing target specifying unit 121, an allocation determining unit for character string elements 122, an index value generating unit 123, and a generating unit for converted data to be managed 124.

The encryption/indexing target specifying unit 121 refers to the encryption/indexing target information stored in the storage unit for encryption/indexing target information 113 and specifies the encryption target and the numerical data from which the index value is generated, both of which are included in the input data to be managed D1.

FIG. 4 is a diagram illustrating an example of the encryption/indexing target information. The encryption/indexing target information includes information for specifying the type of the data to be managed D1 that is an application target and information for specifying a part of the data to be managed D1 in which encryption or generation of the index value. FIG. 4 illustrates an example of the encryption/indexing target information applied to the employee table represented by the relation form of FIG. 2. In the example in FIG. 4, an annual income column and an age column are designated to be encrypted, the annual income column is also designated to generate the index value, and the index value is designated to be a column value "index 1".

FIG. 5 illustrates an example in a case where the numerical data of the annual income column and the age column of the employee table represented by the relation form in FIG. 2 is encrypted, and an index value corresponding to the numerical data of the annual income column is generated and added as a column value "index 1", according to the encryption/indexing target information illustrated in FIG. 4. The employee table illustrated in FIG. 5 corresponds to the converted data to be managed D2 generated by the generating unit for converted data to be managed 124 to be described later. In a case where the server 200 permanently manages the employee table, the information such as annual income and age is specifically required to be concealed, so that such information is stored in an encrypted state in the server 200. In this case, the server 200 is desired to directly execute the operation on the encrypted numerical data. Thus, for the encrypted numerical data to be operated, the index value may be generated using the character string element corresponding to the numerical data, and the magnitude correlation of the encrypted numerical data may be determined using the index value.

The allocation determining unit for character string elements 122 allocates one of the character string elements included in the set of character strings stored in the character string set storage unit 111 to the numerical data specified as a target from which the index value is generated by the encryption/indexing target specifying unit 121.

Figure 6:
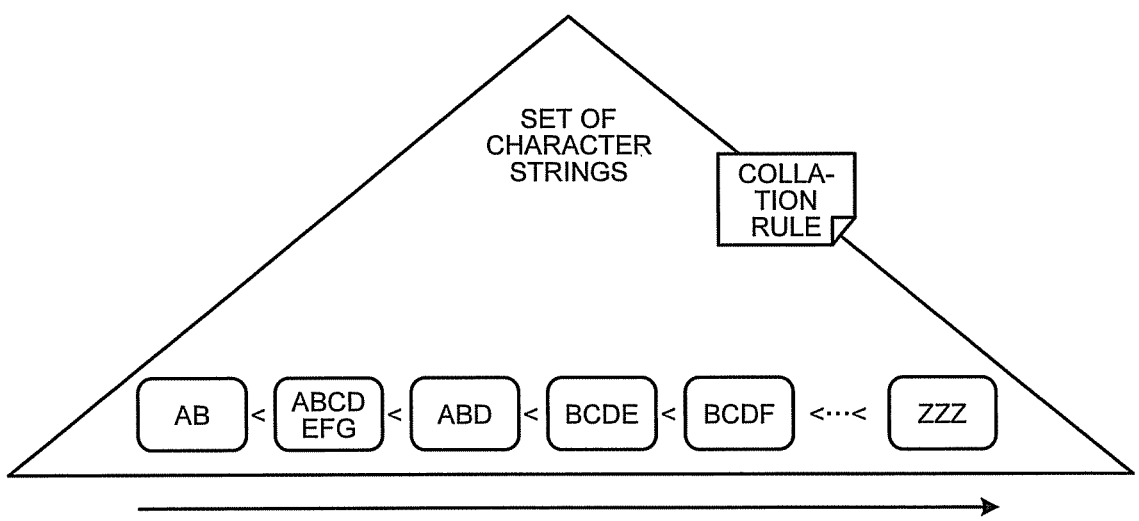
FIG. 6 is a schematic diagram conceptually illustrating a set of character strings stored in a character string set storage unit.

FIG. 6 is a schematic diagram conceptually illustrating a set of character strings stored in the character string set storage unit 111. As illustrated in FIG. 6, the set of character strings is managed such that the character string elements of which magnitude correlation is uniquely identified according to the collation rule are sorted in ascending order. The collation rule may also be referred to as collation. The magnitude correlation of the character string elements is uniquely determined according to the collation rule. The character string elements included in the set of character strings may be generated from an arbitrary dictionary, or may be randomly generated according to the collation rule. Security can be enhanced by generating a relatively large number of character string elements. Accordingly, a threshold may be set to the number of the character string elements included in the set of character strings to continue generation of the character string elements until the number of the character string elements becomes equal to or larger than the threshold when the set of character strings is generated.

Figure 7:
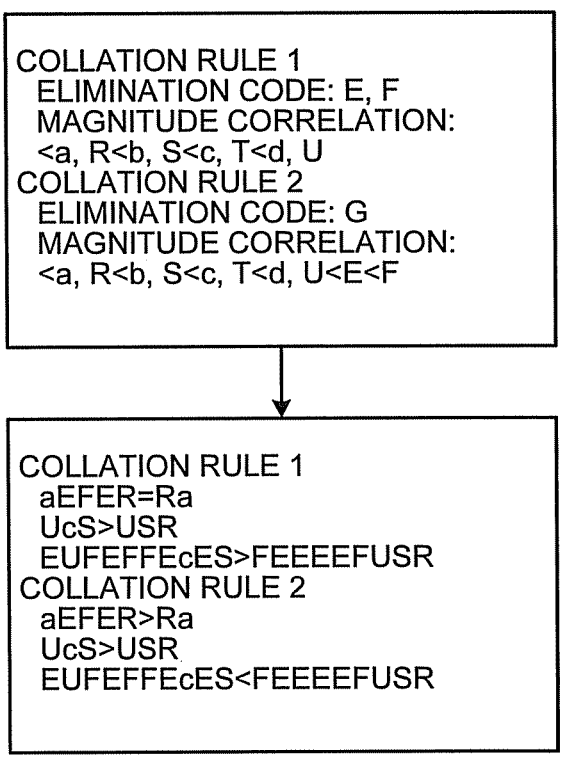
FIG. 7 is a diagram illustrating an example in which magnitude correlation is different even in the same character string depending on a difference in a collation rule.

FIG. 7 is a diagram illustrating an example in which the magnitude correlation is different depending on a difference in collation rule even in the same character string. In the example of FIG. 7, a character string aEER is identical to a character string Ra according to a collation rule 1, but the character string aEER is larger than the character string Ra according to a collation rule 2. In addition, a character string EUFEFFEcES is larger than a character string FEEEEFUSR according to the collation rule 1, but the character string EUFEFFEcES is smaller than the character string FEEEE-FUSR according to the collation rule 2. The collation rule defines the magnitude correlation (including an identical value) of characters, an elimination code that is a dummy character, and the like. For example, in Java (registered trademark), which is a programming language, a Collation class is basically implemented and may be used as the collation rule.

The set of character strings is a set of a plurality of character string elements in which the magnitude correlation is determined according to the collation rule as described above. However, the set of character strings used in the embodiment does not include character string elements that are identical to each other, so that the magnitude correlation is uniquely identified among all of the character string elements. The collation rule used for generating the set of character strings is not specifically limited, and a general Latin rule (a rule defining the magnitude correlation of alphabetic characters) or the like may be used as the collation rule.

The allocation determining unit for character string elements 122 determines a character string element to be allocated to the numerical data from which the index value is generated from among the character string elements included in the set of character strings. The simplest allocation method is to map numerical values given to the character string elements and numerical values represented by the numerical data along the sorting of the character string elements in the set of character strings. However, in a case of attempting to express arbitrary numerical values by a finite number of character string elements, not all of the numerical values can be realistically expressed by the character string elements even if the numerical values are limited to integers. Accordingly, in the embodiment, in a case where the numerical value represented by the numerical data from which the index value is generated is larger than the number of the character string elements included in the set of character strings, the character string elements included in the set of character strings are repeatedly circulated a necessary number of times to determine the character string element to be allocated to the numerical value represented by the numerical data.

That is, for example, in a case where the number of character string elements included in the set of character strings is 100 and numerical values of 0 to 99 are given along the sorting of the character string elements, if the numerical value represented by the numerical data from which the index value is generated is 103 for example, the character string elements included in the set of character strings are circulated once and the character string element corresponding to a numerical value of 3 along the sorting of the set of character strings is allocated to the numerical value of 103. If the numerical value represented by the numerical data from which the index value is generated is 215 for example, the character string elements included in the set of character strings are circulated twice, and the character string element corresponding to the numerical value of 15 along the sorting of the set of character strings is allocated to the numerical value of 215. However, if the character string element allocated in this manner is designated as the index value as it is, the magnitude correlation of the index values is lost. Thus, the index value generating unit 123 to be described later generates the index value by adding information representing the number of circulations to the character string element allocated by the allocation determining unit for character string elements 122. Specifically, for example, in a case where the character string elements included in the set of character strings are circulated once to allocate the character string element, the index value is generated by adding X to the head of the character string element. In addition, in a case where the character string elements included in the set of character strings are circulated twice to allocate the character string element, the index value is generated by adding XX to the head of the character string element. Accordingly, the index value maintaining the magnitude correlation can be generated with feasible cost from the numerical data exceeding the number of the character string elements, while the number of the character string elements included in the set of character strings is kept constant. The auxiliary information storage unit 112 stores therein, as auxiliary information, a rule for a case where a finite number of character string elements constituting the set of character strings are circularly used, such as information representing the number of circulations or the location of the character string element to which the information is added.

The allocation determining unit for character string elements 122 may determine, using a predefined allocation rule, the character string element to be allocated to the numerical data from which the index value is generated from among the character string elements included in the set of character strings. For example, if an allocation function Pos is defined and Pos=n, the character string element in which the numerical value given along the sorting of the set of character strings matches the numerical value represented by the numerical data (if the set of character strings is circulated, a surplus numerical value after circulation) is designated as the character string element to be allocated to the numerical data. If Pos=2n, the character string element in which the numerical value given along the sorting of the set of character strings matches twice of the numerical value represented by the numerical data (if the set of character strings is circulated, a surplus numerical value after circulation) is designated as the character string element to be allocated to the numerical data.

That is, in a case where the numerical value represented by the numerical data from which the index value is generated is 15 for example, if the predefined allocation function is Pos=n, the character string element corresponding to the numerical value of 15 is allocated to the numerical value of 15 along the sorting of the set of character strings. If the predefined allocation function is Pos=2n, the character string element corresponding to the numerical value of 30 is allocated to the numerical value of 15 along the sorting of the set of character strings. Accordingly, the risk that the numerical value is estimated from the index value can be reduced and security can be enhanced.

As described above, in a case where the character string elements included in the set of character strings are circularly used, different allocation rules may be defined depending on the number of circulations. In this manner, if different allocation rules are defined depending on the number of circulations, it is more difficult to estimate the numerical value from the index value, so that security can be further enhanced. The auxiliary information storage unit 112 stores therein, as auxiliary information, the allocation rule used for allocation of the character string element.

The index value generating unit 123 generates the index value using the character string element allocated by the allocation determining unit for character string elements 122 with respect to the numerical data from which the index value is generated. For example, in a case where the allocation determining unit for character string elements 122 circulates once the character string elements included in the set of character strings to allocate the character string element, the index value generating unit 123 generates the index value by adding X to the head of the character string element allocated by the allocation determining unit for character string elements 122. In addition, in a case where the allocation determining unit for character string elements 122 circulates twice the character string elements included in the set of character strings to allocate the character string element, the index value generating unit 123 generates the index value by adding XX to the head of the character string element allocated by the allocation determining unit for character string elements 122.

FIG. 8 is a schematic diagram conceptually illustrating an example of processing in which the allocation determining unit for character string elements 122 allocates the character string element and the index value generating unit 123 generates the index value. FIG. 8 illustrates a case where the number of character string elements included in the set of character strings is 100. Case 1 is an example in which the allocation function is Pos=n for all of the circulations, and Case 2 is an example in which the allocation function Pos is defined per each circulation.

In a case where the allocation determining unit for character string elements 122 allocates the character string element to the numerical value, first, the number of circulations corresponding to the target numerical value is determined. For example, in a case where the target numerical value is 102, the number of circulations of the character string elements included in the set of character strings is one (circulation 1).

Next, the allocation determining unit for character string elements 122 determines the character string element to be allocated to the target numerical value according to the allocation rule Pos based on the determined number of circulations. For example, in a case where the target numerical value is 102, the allocation function corresponding to the circulation 1 is Pos=n in Case 1, so that the character string element "ABD" is allocated. The allocation function corresponding to the circulation 1 is Pos=2n in Case 2, so that the character string element "BCDF" is allocated.

Next, the index value generating unit 123 generates the index value corresponding to the target numerical value by adding the information representing the number of circulations to the character string element allocated by the allocation determining unit for character string elements 122. For example, in a case where the target numerical value is 102, the character string element "ABD" is allocated by the allocation determining unit for character string elements 122 in Case 1, and it is determined that X is added to the head of the character string element in the circulation 1, so that "XABD" is generated as the index value. The character string element "BCDF" is allocated by the allocation determining unit for character string elements 122 in Case 2, and it is determined that X is added to the head of the character string element in the circulation 1, so that "XBCDF" is generated as the index value. With respect to the thus generated index values, the order relation is determined such that the value in which X is added to the head of the character string element is larger than the value in which X is not added to the head of the character string element, and the value in which XX is added to the head of the character string element is larger than the value in which X is added to the head of the character string element. For example, ZZZ<XAB, and XZZZ<XXAB.

When the index value corresponding to the numerical data is generated by the method as described above, there remains a risk that the original numerical value is estimated on the server side because the same index value is generated in a case where the index values are generated for each piece of the numerical data representing the same numerical value. To avoid such a risk, in a case where the index values are generated for each piece of the numerical data representing the same numerical value, the index value generating unit 123 generates the index value by transforming the original character string element of one of the index values according to the collation rule. The thus generated index values are different when the character strings are simply compared (default collation), while it is correctly determined that the index values are the same value when they are compared by designating the collation rule used for transforming the character string element. Because the collation rule used for transforming the character string element is defined on the data processor 100 side, it is difficult to estimate the value on the server 200 side and thus security is enhanced. The collation rule used for transforming the character string element may or may not be the same as the collation rule used for generating the set of character strings.

Figure 9:
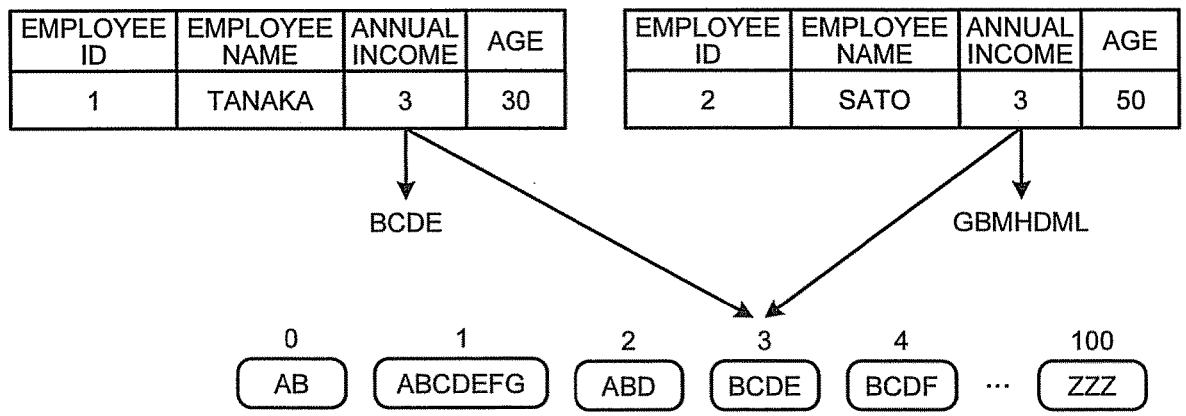
FIG. 9 is a schematic diagram conceptually illustrating processing to transform an character string element allocated to the same numerical value according to the collation rule.

FIG. 9 is a schematic diagram conceptually illustrating processing to transform the character string element allocated to the same numerical value according to the collation rule. For example, the character string element allocated to the numerical value of 3 by the allocation determining unit for character string elements 122 is assumed to be "BCDE" in a case where each of the numerical values represented by the numerical data corresponding to an annual income column is 3 for two records included in the employee table. In this case, if the collation rule in which: "G" and "M" are elimination codes; "C" and "H" are identical; and "L" and "E" are identical, is used, a character string element "BCDE" may be transformed into a character string "GBMHDML", for example. In this case, the index value generating unit 123 may designate the index value corresponding to one piece of the numerical data corresponding to the annual income column for two records as BCDE, and designate the index value corresponding to the other piece of the numerical data as GBMHDML, for example. The index values are different when the character strings are simply compared, but the index values are the same value when they are compared by designating the collation rule.

The search processing may be accelerated by providing some rules when the index value is generated by transforming the character string element according to the collation rule. An example of the rule is that the information representing the number of circulations is maintained as it is even if the character string element is transformed. In a case where the number of character string elements included in the set of character strings is 1000 and there is a rule that X is added to the head of the character string element for each circulation, a range of the numerical value indicated by the index value in which X is not added to the head of the character string element is 0 to 999, a range of the numerical value indicated by the index value in which X is added to the head of the character string element is 1000 to 1999, and a range of the numerical value indicated by the index value in which XX is added to the head of the character string element is 2000 to 2999. These facts are not recognizable on the server 200 side, but are recognizable on the data processor 100 side. Thus, for example, designating a SQL function match (value, "X") for the index value of the column is synonymous with searching the elements of 1000 to 1999, and designating a SQL function match (value, "XX") is synonymous with searching the elements of 2000 to 2999. This method is effective to solve the range (value) search in a case where only the data processor 100 can have the collation rule, and the index value in a range that is obviously unnecessary can be eliminated.

It is also effective to retain information for discriminating the index value requiring collation solution and the others. That is, in a case where two different index values are generated from an identical value using the collation rule, the magnitude correlation of the index values is determined by using the collation rule. However, because the processing using the collation rule is often performed at a lower speed than that of the general comparison processing, it is desirable to optimize the query expression on the data processor 100 side by considering the problem. In a case where the index value is generated by transforming the character string element using the collation rule, information indicating that the collation solution is required for the character string element is retained as a bit string. In a case where the index value is generated in a circulation similarly using the collation rule for each circulation, information indicating that the collation solution is required in the circulation is retained as a bit string. The character string element may have a bit string in each circulation. However, a scheme is adopted herein in which the bit string for the character string element and the bit string for circulation are superimposed to reduce an amount of information. Accordingly, it is possible to determine whether the collation solution using the collation rule according to the range search of the query expression should be performed, so that query for the value can be optimized.

The information for discriminating the index value requiring collation solution and the others may be stored, for example, in the auxiliary information storage unit 112 as one piece of the auxiliary information. A method for directly incorporating the information indicating whether the collation solution is required into the index value may also be possible. For example, the index value may be generated by reserving for determination one of the characters designated as the elimination code in the collation rule, and adding the reserved character to the head of the character string element or subsequent to the information representing the number of circulations (X, XX, and the like).

The generating unit for converted data to be managed 124 encrypts the numerical data of the data to be managed D1 specified as the encryption target by the encryption/indexing target specifying unit 121, using the key information stored in the key information storage unit 114, and adds the index value generated by the index value generating unit 123 thereto to generate the converted data to be managed D2. The thus generated converted data to be managed D2 is transmitted from the data processor 100 to the server 200 as described above, and stored in the data storage unit 210 of the server 200.

Figure 10:
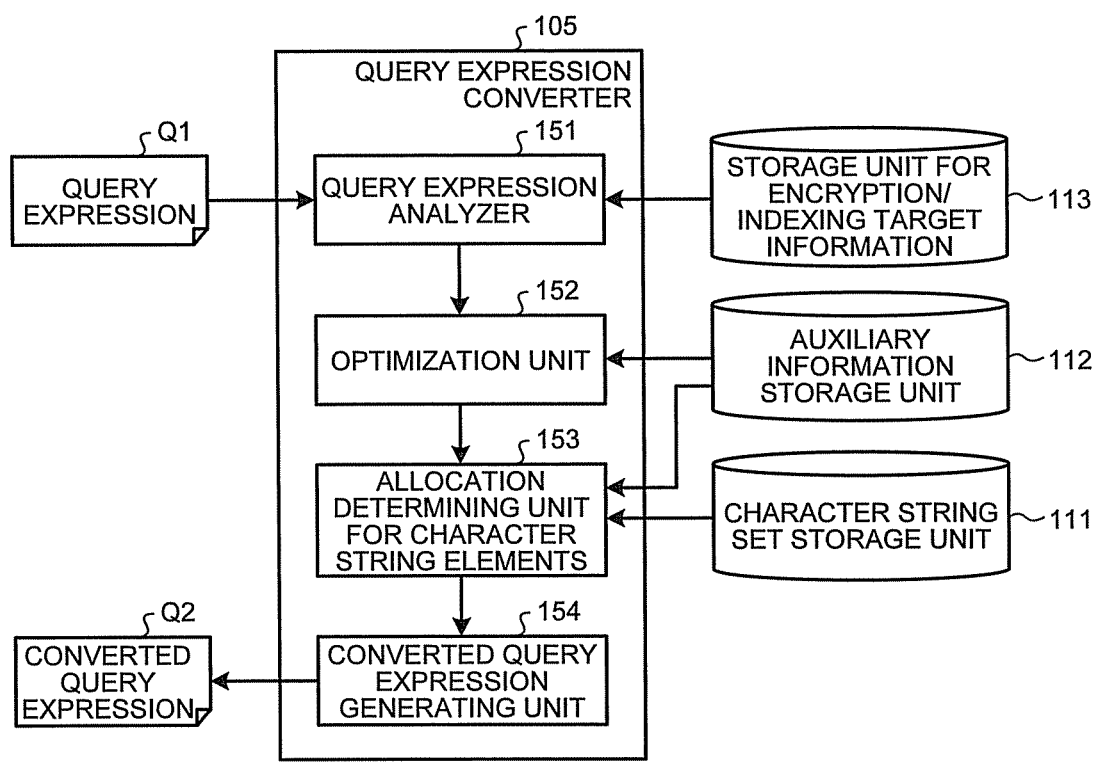
FIG. 10 is a block diagram illustrating a specific configuration example of a query expression converter.

Next, the query expression converter 105 included in the data processor 100 will be further described in detail while specific examples of processing are exemplified. FIG. 10 is a block diagram illustrating a specific configuration example of the query expression converter 105.

As illustrated in FIG. 10, the query expression converter 105 includes a query expression analyzer 151, an optimization unit 152, an allocation determining unit for character string elements 153, and a converted query expression generating unit 154.

The query expression analyzer 151 analyzes the input query expression Q1, and specifies a condition part to search the numerical data from which the index value is generated, using the encryption/indexing target information stored in the storage unit for encryption/indexing target information 113.

The optimization unit 152 optimizes a condition part of the query expression Q1 specified by the query expression analyzer 151 using the auxiliary information (a rule in a case where the character string elements are circularly used, information for discriminating the index value requiring collation solution and the others, or the like) stored in the auxiliary information storage unit 112.

FIG. 11 is a schematic diagram conceptually illustrating an example of processing to optimize the condition part of the query expression Q1 using the auxiliary information. In the example of FIG. 11, the number of the character string elements included in the set of character strings is 3000 (0 to 2999). Because the allocation function is Pos=3n in a circulation 0 in which the character string elements included in the set of character strings are not circulated, the numerical value to which the character string element is allocated from the circulation 0 is in a range from 0 to 999, so that the information representing whether the collation solution should be performed indicates that the collation is not required. Also, because the allocation function is Pos=3n in a circulation 1 in which the character string elements included in the set of character strings are circulated once, the numerical value to which the character string element is allocated from the circulation 1 is in a range from 1000 to 1999, so that the information representing whether the collation solution should be performed indicates that the collation is required. In addition, because the allocation function is Pos=n in a circulation 2 in which the character string elements included in the set of character strings are circulated twice, the numerical value to which the character string element is allocated from the circulation 2 is in a range from 2000 to 4999, so that the information representing whether the collation solution should be performed indicates that the collation is not required. The information indicating the allocation function for each circulation or the information indicating whether the collation solution should be performed is obtained from the auxiliary information storage unit 112, for example.

It can be seen in the query expression 1 of FIG. 11 that the range represented by the numerical value of the condition part is within the range of the circulation 0. The index value corresponding to the numerical value to which the character string element is allocated in the circulation 0 does not require the collation solution using the collation rule. Thus, the condition part of the query expression 1 is not necessarily be specifically optimized. It is sufficient to convert the numerical value thereof into the index value using the character string element in the circulation 0.

It can be seen in the query expression 2 of FIG. 11 that the range represented by the numerical value of the condition part extends over two circulations: the circulation 1 and the circulation 2. The index value corresponding to the numerical value to which the character string element is allocated in the circulation 2 does not require the collation solution using the collation rule, but the index value corresponding to the numerical value to which the character string element is allocated in the circulation 1 requires the collation solution using the collation rule. Assuming that the character representing the circulation 1 is X, all of the records having the index value using the character string element in the circulation 1 may be taken out by a function match (t. value, "X"). With respect to the circulation 2, because the collation solution using the collation rule is not required and the processing can be directly performed on the server 200 side, the numerical value range of the condition part is replaced so that the search range is from the leading numerical value among the numerical values corresponding to the circulation 2 to the upper limit in the numerical value range of the condition part. In this case, if the leading numerical value among the numerical values corresponding to the circulation 2 is simply used, the leading character string element of the set of character strings is specified on the server 200 side. To avoid this, the numerical value range of the condition part is replaced after the range is extended to include the circulation 1. In the example of FIG. 11, the value 1535 randomly selected from the circulation 1 is set to the lower limit of the numerical value range. In this case, records in some sections are retrieved in a duplicated manner. To avoid this, distinct processing is added to the query expression.

Similarly to the allocation determining unit for character string elements 122 of the data converter 102, the allocation determining unit for character string elements 153 determines the character string element allocated to the numerical value of the condition part of the query expression Q1 from among the set of character strings stored in the character string set storage unit 111 using the auxiliary information (the allocation function used for allocating the character string element, a rule in a case where the character string elements are circularly used, and the like) stored in the auxiliary information storage unit 112. The condition part of the query expression Q1 is a condition part optimized by the optimization unit 152 as necessary.

The converted query expression generating unit 154 converts the condition part (the condition part optimized by the optimization unit 152 as necessary) of the query expression Q1 into the condition part using the character string element allocated by the allocation determining unit for character string elements 153, and generates the converted query expression Q2. The thus generated converted query expression Q2 is transmitted from the data processor 100 to the server 200 as described above, and used for the query processing in the server 200.

Subsequently, when the result data set R1 resulting from the query processing executed using the converted query expression Q2 is transmitted from the server 200 to the data processor 100, the post-processing unit 108 converts the result data set R1 into the returned result data set R2, which is finally returned to the user as a response to the query expression Q1, as described above. The processing in the post-processing unit 108 may be performed when needed. In a case where the search result does not include an encrypted portion or a case where it is previously known that the collation on the data processor 100 side is not required due to optimization, the result data set R1 may be directly returned to the user as the returned result data set R2.

Second Embodiment

Next, a second embodiment will be described. In the second embodiment, a collation solution program for performing collation solution of the index value is transmitted from the data processor 100 to the server 200, and the server 200 performs the collation solution of the index value using the collation solution program.

Figure 12:
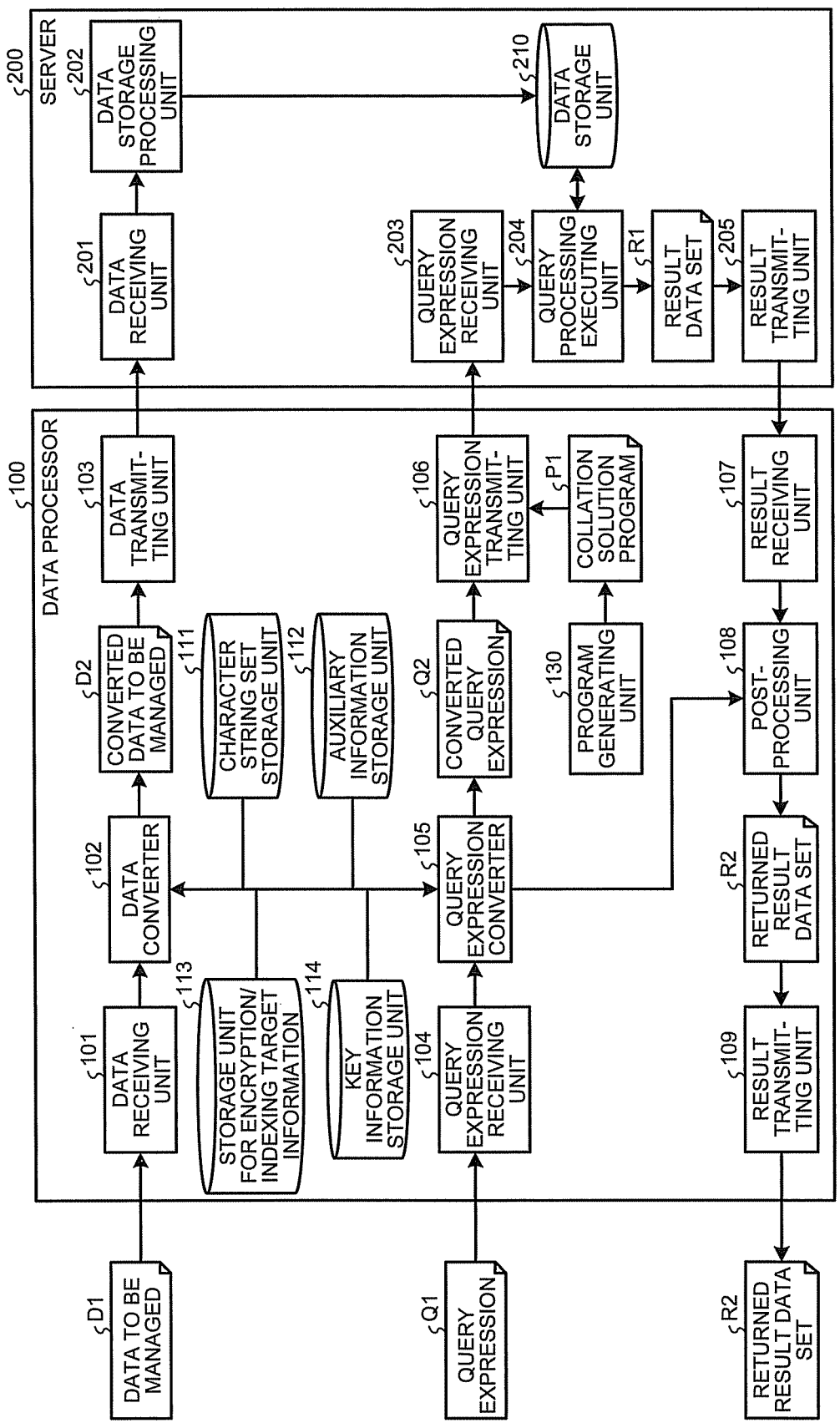
FIG. 12 is a block diagram illustrating an entire configuration of a data management system according to a second embodiment.

FIG. 12 is a block diagram illustrating an entire configuration of a data management system according to the second embodiment. In the data management system of the present embodiment, a program generating unit 130 for generating a collation solution program P1 is added as a functional component of the data processor 100. Other configuration thereof is the same as that of the data management system in the first embodiment illustrated in FIG. 1.

According to the collation rule used when the index value by the data converter 102 is generated so as to transform the character string element, the program generating unit 130 generates the collation solution program P1 for performing collation solution with respect to the index value that requires collation solution. The collation solution program P1 generated by the program generating unit 130 is transmitted from the query expression transmitting unit 106 to the server 200 along with the converted query expression Q2 generated by the query expression converter 105.

In the second embodiment, the query expression converter 105 of the data processor 100 generates, for the value in the condition part of the query expression that requires the collation solution, the converted query expression Q2 to which a collate notation is added. FIG. 13 is a diagram illustrating an example of a converted query expression Q2 to which the collate notation is added. As illustrated in FIG. 13, for example, the collation notation is given after a syntax that requires the collation solution, in a form of designating the collation solution program P1 used for the collation solution. This is a syntax also prescribed in general query languages such as SQL and XQUERY.

On the server 200 side, the converted query expression Q2 is analyzed when the query processing executing unit 204 executes the query processing using the converted query expression Q2. If a syntax with the collate notation (collate "xxx") added thereto is detected, it is checked whether the collation solution program P1 transmitted along with the converted query expression Q2 is designated by the collation notation. If so, the collation solution is performed using the collation solution program P1.

For example, it is preferred that the collation solution program P1 be a computer program (software) with high tamper resistance having only a function to specify the magnitude correlation between two values (returning −1, 0, and 1) as a program interface, and have a configuration in which the collation rule itself is not identified. In a case where the security on the server 200 side is guaranteed, the collation solution program P1 may be registered to the server 200 side in advance instead of being transmitted from the data processor 100 to the server 200 along with the converted query expression Q2 each time the query is performed.

In the configuration of the second embodiment, even if the index value requiring the collation solution is included, almost all processing such as range search, MAX/MIN processing, join processing, and sort processing may be directly executed on the server 200 side. Unless the result data set R1 resulting from the query processing includes the encrypted numerical data, the result data set R1 may be directly returned to the user as the returned result data set R2.

As described above, in the configuration of the second embodiment, although a security level is slightly inferior to the case where the collation solution is performed on the data processor 100 side, almost all processing related to values may be executed on the server 200 side. Thus, it is desirable to adopt this configuration when a greater value is placed on high performance than security.

Third Embodiment

Next, a third embodiment will be described. In the third embodiment, a server different from the server 200 is used for performing collation solution of the index value.

Figure 14:
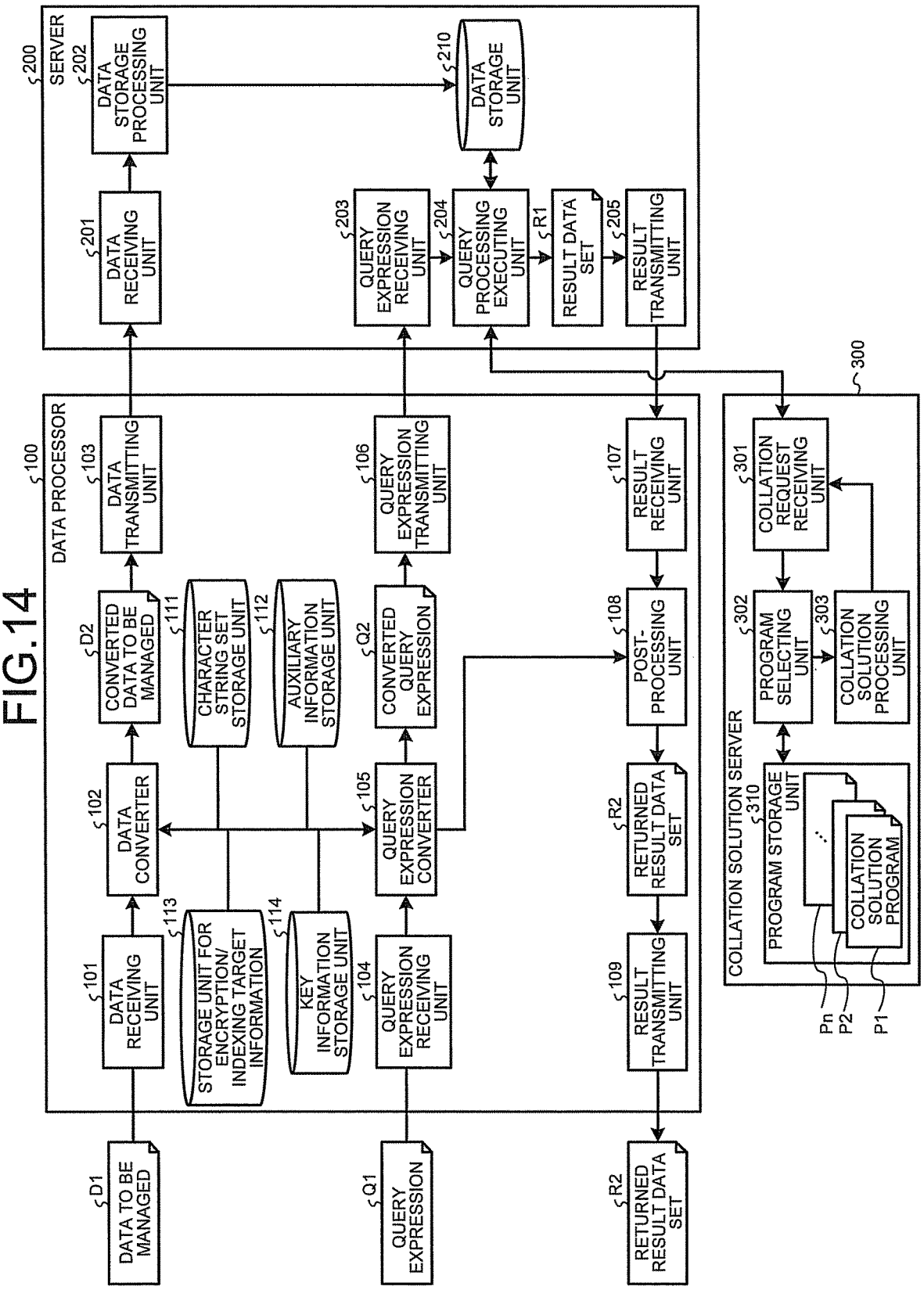
FIG. 14 is a block diagram illustrating an entire configuration of a data management system according to a third embodiment.

FIG. 14 is a block diagram illustrating an entire configuration of a data management system according to the third embodiment. As illustrated in FIG. 14, the data management system of the present embodiment includes a collation solution server 300 that is configured to be separated from the data processor 100 and the server 200 and communicatively connected with the server 200 via a network. Other configuration thereof is the same as that of the data management system according to the first embodiment illustrated in FIG. 1.

The collation solution server 300 includes a collation request receiving unit 301, a program selecting unit 302, a collation solution processing unit 303, and a program storage unit 310.

The program storage unit 310 stores therein collation solution programs P1, P2, . . . , Pn. The collation solution programs P1, P2, . . . , Pn are programs registered in response to a request from the data processor 100 in advance, and correspond to the collation rules used for transforming the character string elements in the data processor 100. The collation solution programs P1, P2, . . . , Pn may be specified by Uniform Resource Identifiers (URIs) given to the respective collation solution programs. For example, in a case where the URL of the collation solution server 300 is "http://www.toshiba.co.jp", the URI of the collation solution program given the name of "collation1" is "http://www.toshiba.co.jp/collation1". By designating the URI, the collation solution program given the name of "collation1" can be taken out. The data processor 100 is informed of the URI of each of the collation solution programs at the time of registration of the collation solution programs.

The collation request receiving unit 301 receives a collation request from the server 200 and returns, to the server 200, a result of the collation solution processing performed by the collation solution processing unit 303 in response to the collation request.

On the basis of a URI notation included in the collation request from the server 200, the program selecting unit 302 selects the collation solution program used for the collation solution processing in the collation solution processing unit 303 from among the collation solution programs P1, P2, . . . , Pn stored in the program storage unit 310, and passes the selected program to the collation solution processing unit 303.

The collation solution processing unit 303 performs the collation solution processing of the value included in the collation request from the server 200 using the collation solution program selected by the program selecting unit 302. The result of the collation solution processing by the collation solution processing unit 303 is returned from the collation request receiving unit 301 to the server 200 as a response to the collation request.

In the third embodiment, the query expression converter 105 of the data processor 100 generates the converted query expression Q2 in a form in which the collation solution program used for the collation solution is embedded using a URI expression, as for the value requiring the collation solution of the condition part of the query expression. FIG. 15 is a diagram illustrating an example of the converted query expression Q2 in which the collation solution program used for the collation solution is embedded using a URI expression. The query expression of such a form also does not depart from specifications of general query languages such as SQL and XQUERY.

On the server 200 side, the converted query expression Q2 is analyzed when the query processing executing unit 204 executes the query processing using the converted query expression Q2. If a syntax designated by a URI is detected, the server 200 sends a collation request to the collation solution server 300. For example, the query processing executing unit 204 of the server 200 sends a collation request in a form of such as Compare (x1, x2, "http://www.toshiba.co.jp/collation1") to the collation request receiving unit 301, as for two character strings of which collation relation is desired to be solved. The collation request is received by the collation request receiving unit 301 of the collation solution server 300. The program selecting unit 302 selects the collation solution program given the name of "collation1" in the program storage unit 310 and passes the selected program to the collation solution processing unit 303. The collation solution processing unit 303 determines magnitude correlation between the two values, x1 and x2, using the collation solution program given the name of "collation1", and returns the result thereof from the collation request receiving unit 301 to the query processing executing unit 204 of the server 200.

In the configuration of the third embodiment, the server 200 may be informed of only the magnitude correlation between two character strings, and cannot be informed of the collation rule itself. Accordingly, the risk that the collation rule is specified on the server 200 side can be reduced in the configuration of the third embodiment. However, in the configuration of the third embodiment, there are some disadvantages such that the collation solution server 300 should also have high reliability, the risk that the collation rule is identified cannot be completely eliminated, and a processing time becomes longer than that in the second embodiment because the collation solution processing is performed via a network. Nevertheless, in the configuration of the third embodiment, condition processing as for the value can be completed only on the server 200 side, so that the third embodiment is more suitable than the second embodiment for use in a case where security is desired to be enhanced although the performance may be slightly degraded.

EXAMPLES

Next, according to the configuration of the above-described embodiments, specific examples of a behavior of returning the returned result data set R2 in response to the query expression Q1 issued by the user will be described as first to fourth examples. FIG. 16 is a schematic diagram describing outlines of the first example (a), the second example (b), the third example (c), and the fourth example (d).

The first example is premised on the configuration of the first embodiment, in which the character string element is not transformed using the collation rule at the time of data registration (that is, it is allowed to generate identical index values for identical numerical data). The second example is premised on the configuration of the second embodiment, in which the character string element is transformed using the collation rule at the time of data registration, the data processor 100 passes the collation solution program to the server 200, and the collation solution is performed using the collation solution program on the server 200 side. The third example is premised on the configuration of the third embodiment, in which the character string element is transformed using the collation rule at the time of data registration, and the collation solution is performed using the collation solution server 300. The fourth example is premised on the configuration of the first embodiment, in which the character string element is transformed using the collation rule at the time of data registration, and the collation solution is performed on the data processor 100 side.

Figure 17:
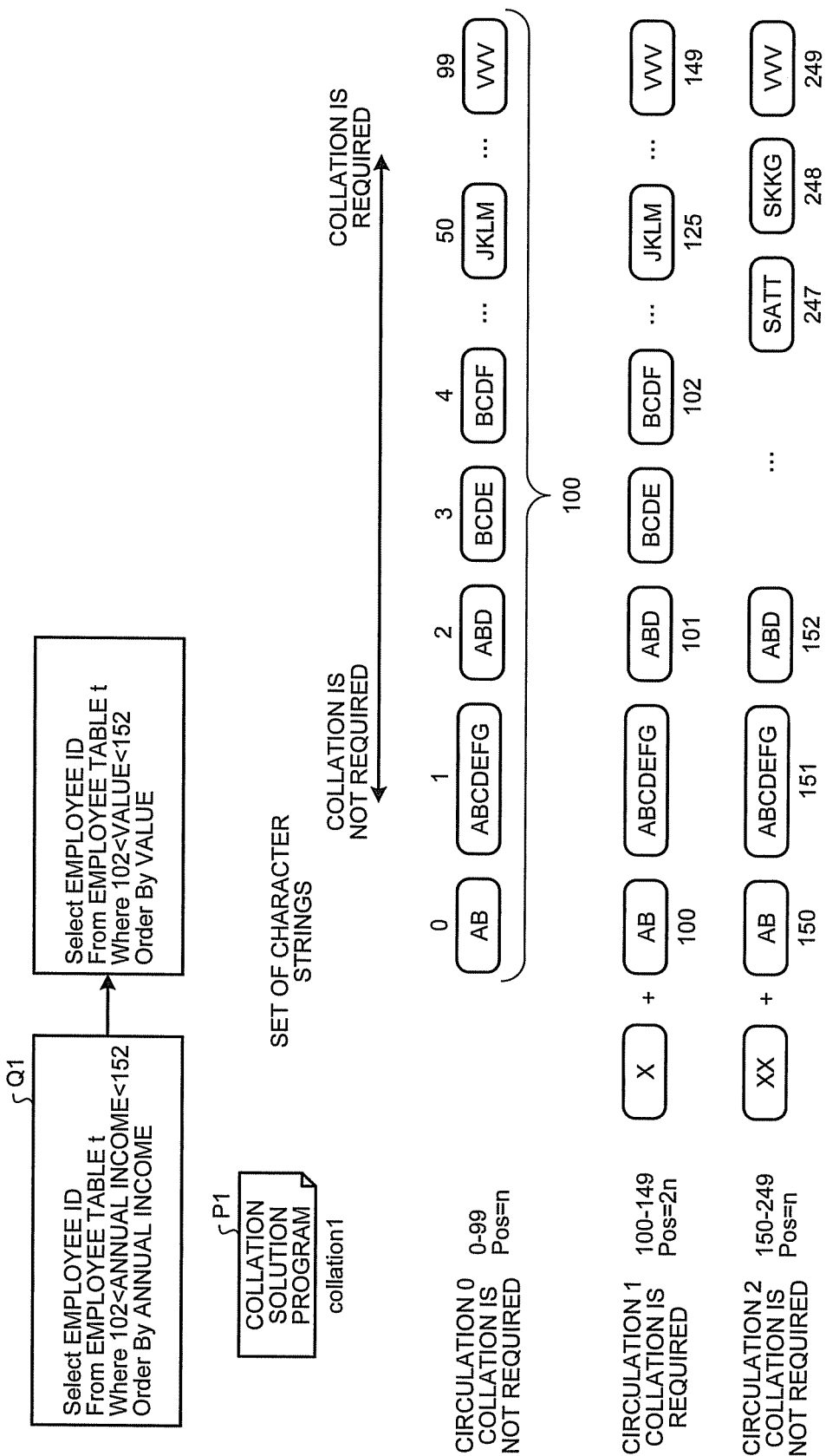
FIG. 17 is a diagram illustrating conditions handled by the first to fourth examples.

FIG. 17 is a diagram illustrating conditions handled in the first to fourth examples. In the first to fourth examples, the query expression Q1 issued by a user is a query expression whose target of the range search is the annual income column of the employee table stored in the data storage unit 210 of the server 200. In addition, the query expression Q1 requires that the annual income in the range is eventually sorted by "Order By", and only an employee ID that is not the annual income is taken out by a "Select" portion and returned to the user. Because the annual income column of the employee table stored in the data storage unit 210 of the server 200 is encrypted, a condition of the range search is converted to a condition related to the index value column corresponding to the annual income column, and the upper limit, the lower limit, and the like are set by optimization.

It is assumed that the set of character strings used for generating the index value is the same as those described in Case 2 of FIG. 8 and that auxiliary information is stored such that the collation solution with respect to the index value is not required as for the circulation 0 and the circulation 2 but is required only within the range of the circulation 1. It is also assumed that the number of the character string elements is 100, and the auxiliary information is stored such that: the collation solution is not required for the character string element in which the numerical value given according to the sorting of the set of character strings is 0 to 50; and the collation solution is required for the character string element in which the numerical value given according to the sorting of the set of character strings is 51 to 99. It is further assumed that the name given to the collation solution program P1 used for the collation solution is "collation1", and the URL of the collation solution server 300 used for the collation solution in the third example is "http://www.toshiba.co.jp".

FIG. 18 is a diagram illustrating the converted query expressions Q2 generated by the query expression converter 105 of the data processor 100 in the first to fourth examples. The converted query expression Q2 generated in the first example is illustrated as a converted query expression 1, the converted query expression Q2 generated in the second example is illustrated as a converted query expression 2, the converted query expression Q2 generated in the third example is illustrated as a converted query expression 3, and the converted query expression Q2 generated in the fourth example is illustrated as a converted query expression 4.

Because the collation solution is not performed for the index value in the first example, the processing can be completed only by the server 200 using the index value of an index column of the employee table stored in the server 200 without using the collation solution program P1. Accordingly, in the first example, the result data set R1 resulting from the query processing performed by the query processing executing unit 204 of the server 200 can be directly returned to the user as the returned result data set R2 unless a result acquiring unit (in the case of SQL, "Select" portion) of the query expression Q1 requires acquisition of the encrypted data.

In the first example, a portion of 102<value<152 that is a condition part of the query expression Q1 is converted to "XBCDF"<value<"XXABD" using the set of character strings used at the time of data registration. An "Order By" portion need not to be converted because the collation solution is not required. Accordingly, as illustrated by the converted query expression 1 in FIG. 18, the conclusive converted query expression Q2 in the first example is as follows:
Select employee ID
From employee table
Where "XBCDF"<value<"XXABD"
Order By value.
The result data set R1 resulting from the query processing using the converted query expression Q2 is directly returned to the user as the returned result data set R2.

In the second example, the collation solution is performed on the server 200 side using the collation solution program P1 generated by the program generating unit 130 of the data processor 100. Also in this case, similarly to the first example, the result data set R1 resulting from the query processing performed by the query processing executing unit 204 of the server 200 can be directly returned to the user as the returned result data set R2 unless the result acquiring unit (in the case of SQL, "Select" portion) of the query expression Q1 requires acquisition of the encrypted data. However, when the collation solution is performed using the collation solution program P1, processing speed is slightly lower than that in a case where the collation solution is not performed, so that the query expression is optimized as much as possible using the auxiliary information on the data processor 100 side.

According to the condition illustrated in FIG. 17, the section 102<value<152 extends over the circulation 1 and the circulation 2, and it can be recognized from the auxiliary information that the collation solution is not required for the circulation 2. Thus, the collation solution need not to be performed by the server 200 by designating the collation solution program P1 as for the section 150<value<152 belonging to the circulation 2. Although the collation solution is required in any of the character string elements as for the circulation 1, it is also recognized from the auxiliary information that the collation solution is not required in the section 100<value<125. By contrast, the collation solution is required for the section 125≤value<150, so that a collate notation designating "collation1" that is a program name of the collation solution program P1 used for the collation solution is given after to a syntax requiring the collation solution. A required query expression is obtained by performing OR operations under the condition in which the range is divided as described above.

Specifically, according to the second example, the query expression Q1 is transformed by optimization processing as follows:
Select employee ID
From employee table
Where (102<value<125)
Or (125≤value<150 collate "collation1")
Or (150≤value<152)
Order By value collate "collation1".

As described above, the collate notation designating "collation1" that is the program name of the collation solution program P1 used for the collation solution is given to a portion of "Order By" as well. As described above, when the condition part in the range search is divided, the divided range is preferably set by overlapping part of the range so as not to carelessly use the leading character string or the last character string element in the set of character strings. However, the processing thereof is not described herein.

In the second example, with respect to the query expression Q1 transformed as described above, each of the condition parts, that is, (102<value<125), (125≤value<150), and (150≤value<152), is converted using the set of character strings used at the time of data registration. Accordingly, as illustrated by the converted query expression 2 in FIG. 18, the conclusive converted query expression Q2 in the second example is as follows:
Select employee ID
From employee table
Where ("XBCDF"<value<"XJKLM")
Or ("XJKLM"≤value<"XXAB" collate "collation1")
Or ("XXAB"≤value<"XXABD")
Order By value collate "collation1".

In the third example, instead of the server 200, the collation solution processing unit 303 of the collation solution server 300 performs the collation solution in response to the request from the server 200, using the collation solution program P1 registered in advance. In the third example, the collation solution is performed by the collation solution server 300 external to the server 200. Thus, compared to the second example, it is more important to optimize the query expression as much as possible using the auxiliary information on the data processor 100 side in the third example.

Although a method for optimizing the query expression in the third example is the same as that in the second example, the collation solution program P1 used for the collation solution is designated by using a URI. Herein, the URL of the collation solution server 300 is "http://www.toshiba-.co.jp" and the name given to the collation solution program P1 is "collation1", so that the URI of the collation solution program P1 is "http://www.toshiba.co.jp/collation1".

In the third example, the URI of the collation solution program P1 used for the collation solution is designated. In addition, after the query expression Q1 is transformed so as to divide the condition part as in the second example, each of the divided condition parts is converted using the set of character strings used at the time of data registration. Accordingly, as illustrated by the converted query expression 3 in FIG. 18, the conclusive converted query expression Q2 in the third example is as follows:
Select employee ID
From employee table
Where ("XBCDF"<value<"XJKLM")
Or ("XJKLM"≤value<"XXAB" collate "http://www.toshiba.co.jp/collation1")
Or ("XXAB"≤value<"XXABD")
Order By value collate http://www.toshiba.co.jp/collation1.

In the fourth example, it is recognized from the auxiliary information that the collation solution cannot be performed on the server 200 side and the condition part of the query expression Q1 includes a section requiring collation solution. Accordingly, the query expression converter 105 of the data processor 100 generates the converted query expression Q2 that acquires a solution candidate from the server 200, and inputs the result data set R1 acquired by the converted query expression Q2 to the post-processing unit 108 as a primary result set. The input data is subjected to the collation solution and sort processing in the post-processing unit 108, and after that, returned to the user as the returned result data set R2.

Because the range 102<value<150 among 102<value<152 in the condition part of the query expression Q1 belongs to the circulation 1 that requires collation solution, the condition part with this range is converted into a condition part of which solution candidate is within the range using a match function. In addition, because the range of 150≤value<152 belongs to the circulation 2 that does not require collation solution, the condition part with this range is transformed into a range search condition that normal query processing is performed, and converted using the set of character strings used at the time of data registration. Accordingly, as illustrated by a converted query expression 4-1 in FIG. 18, the converted query expression Q2 transmitted from the data processor 100 to the server 200 in the fourth example is as follows:
Select *
From employee table
Where match (value, "X") Or ("XXAB≤value<"XXABD")
Order By value.

Although "Order By" may be omitted in the converted query expression Q2 transmitted to the server 200 and implemented only on the data processor 100 side, "Order By" is implemented on the server 200 side in a state where the collation solution is not performed herein. The intension thereof is to cause the server 200 side to perform high-cost processing as much as possible by taking advantage of the fact that at least the number of circulations is determined regardless of whether the collation solution is performed. "Select *" is provided to acquire the index value because collation solution processing is required on the data processor 100 side. The result data set R1 resulting from the query processing using the converted query expression Q1 is input to the post-processing unit 108 of the data processor 100 as a primary result set, and subjected to the query processing in the post-processing unit 108 according to the collation rule used in transforming the character string element.

The converted query expression Q2 used for the query processing with respect to the primary result set is converted using the set of character strings used by the upper limit and the lower limit at the time of data registration while 102<value<152 that is a condition part of the original query expression Q1 is not specifically transformed. In addition, the sort processing that is not completely performed in the processing on the server 200 side is performed again by designating the collation rule used for the collation solution. Similarly to the second and third examples, the collation solution is performed using the collation solution program P1 generated based on the collation rule used for transforming the character string element, and the name of the collation solution program P1, that is, "collation1", is designated. In this case, a sorted portion (a sorted portion in a state where the collation solution is not performed) and a portion of which location is not determined (a hit portion by the match function) are recognized on the server 200 side, so that the query processing may be further accelerated by taking advantage of the fact described above.

As illustrated by the converted query expression 4-2 in FIG. 18, the converted query expression Q2 used for the query processing with respect to the primary result set performed by the post-processing unit 105 of the data processor 100 in the fourth example is as follows:
Select employee ID
From primary result set
Where "XBCDF"<value<"XXABD" collate "collation1"
Order By value collate "collation1".

In the fourth example, the result of the query processing using the converted query expression Q2 is returned to the user as returned result data set R2.

As described in the first to fourth examples, the data management system according to the above-described embodiments can adopt appropriate system configurations depending on the security level, response performance, and the like desired by the user, and perform processing so that the security level and the performance are both achieved as much as possible. In this way, the data management system according to the embodiments may realize high-performance search while maintaining high security.

Figure 19:
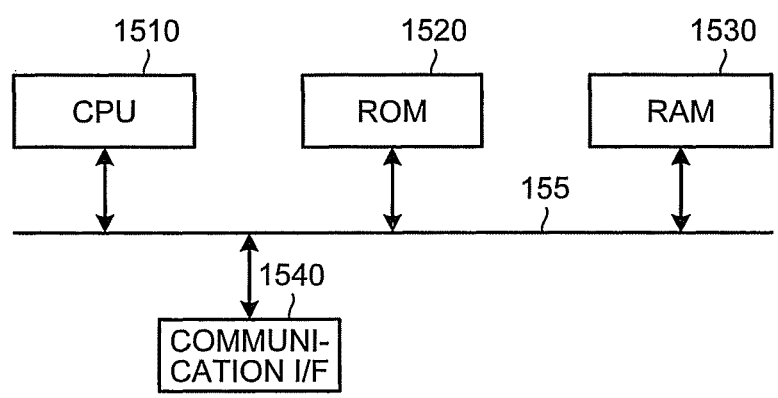
FIG. 19 is a diagram illustrating an example of hardware configuration of the data processor.

For example, the function of the data processor 100 in the data management system according to the embodiments may be realized by executing a predetermined program in the data processor 100. In this case, as illustrated in FIG. 19 for example, the data processor 100 has a hardware configuration utilizing a normal computer including a control device such as a CPU (Central Processing Unit) 1510, storage devices such as a ROM (Read Only Memory) 1520 and a RAM (Random Access Memory) 1530, a communication I/F 1540 that performs communication by connecting to a network, and a bus 155 connecting respective portions with each other.

The program executed by the data processor 100 is recorded in computer-readable recording media such as a CD-ROM (Compact Disk Read Only Memory), a flexible disk (FD), a CD-R (Compact Disk Recordable), a DVD (Digital Versatile Disc), and the like as a file in an installable format or executable format, and provided as a computer program product.

The program executed by the data processor 100 may be configured to be provided such that the program is stored in a computer connected to a network such as the Internet and downloaded via the network. The program executed by the data processor 100 may also be configured to be provided or distributed via a network such as the Internet.

In addition, the program executed by the data processor 100 may be configured to be provided by being incorporated into the ROM 1520 and the like in advance.

The program executed by the data processor 100 has a module configuration including respective processing units of the data processor 100 (the data receiving unit 101, the data converter 102, the data transmitting unit 103, the query expression receiving unit 104, the query expression converter 105, the query expression transmitting unit 106, the result receiving unit 107, the post-processing unit 108, the result transmitting unit 109, and the program generating unit 130). For example, actual hardware has a configuration in which the CPU 1510 (processor) reads out the program from the recording media and executes the program, so that the processing units are loaded on a main storage device and the processing units are generated on the main storage device. In the data processor 100, part or all of the respective processing units may be realized using dedicated hardware such as an ASIC (Application Specific Integrated Circuit) or FPGA (Field-Programmable Gate Array).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processor comprising:
    a memory; and
    one or more processors configured to function as a target specifier, an allocator, a first generator, a second generator, a first transmitter, a query expression converter, a second transmitter and a receiver, wherein
        the target specifier specifies, as a target for encryption and generation of an index, numerical data included in data to be managed;
        the allocator allocates a first character string element included in a set of character strings to the specified numerical data to uniquely express the specified numerical data, the set of character strings is a set of a plurality of character string elements of which magnitude correlation is uniquely identified and constructed in advance according to a collation rule;
        the first generator generates the index by using the first character string element allocated to the specified numerical data;
        the second generator encrypts the specified numerical data and add the index thereto to generate converted data to be managed;
        the first transmitter transmits the converted data to be managed to a server;
        the query expression converter converts a numerical value in a condition part of a query expression into a second character string element included in the set of character strings to generate a converted query expression;
        the second transmitter transmits the converted query expression to the server; and
        the receiver receives, from the server, a result of query processing executed using the converted query expression, wherein the server performs query processing with respect to the index included in the converted data to be managed and corresponding to the encrypted numerical value on the basis of the second character string element included in the converted query expression so that a result of the query processing is adapted to a condition part of the converted query expression and transmit the result to the data processor, wherein
    when the target specifier specifies subsequent pieces of the numerical data representing a same numerical value, the first generator generates the index with respect to one of the subsequent pieces of the numerical data by adding a dummy character defined by the collation rule to the first character string element allocated common to the subsequent pieces of the numerical data and by replacing a character included in the first character string element allocated common to the subsequent pieces of the numerical data with an equivalent character in a magnitude correlation defined by the collation rule.

2. The data processor according to claim 1, wherein
    when the numerical value represented by the numerical data is larger than the number of the character string elements included in the set of character strings, the allocator circulates the character string elements included in the set of character strings to specify the first character string element to be allocated to the specified numerical data and the first generator generates the index by adding information representing the number of circulations to the specified first character string element, and
    when the numerical value used in the condition part of the query expression is larger than the number of the character string elements included in the set of character strings, the query expression converter circulates the character string elements included in the set of character strings to specify the second character string element to be allocated to the numerical value used in the condition part of the query expression, and convert the condition part of the query expression using the specified second character string element and the information representing the number of circulations.

3. The data processor according to claim 1, wherein
    the allocator specifies, according to on a predefined allocation rule, the first character string element from among the character string elements included in the set of character strings, and the first generator generates the index by using the specified first character string element, and
    the query expression converter, according to the allocation rule, specifies the second character string element to be allocated to the numerical value used in the condition part of the query expression from among the character string elements included in the set of character strings, and converts the condition part of the query expression by using the second character string element.

4. The data processor according to claim 1, wherein
    the query expression converter converts the condition part of the query expression into a condition part that is divided into a portion including a character string element in which collation of the magnitude correlation is required and a portion without the character string element in which collation processing of the magnitude correlation is required.

5. The data processor according to claim 4, wherein the one or more processors is configured to further function as a program generator, and
    the program generator generates a collation solution program for performing collation of the magnitude correlation of the character string elements, and transmits the collation solution program to the server along with the converted query expression.

6. A data management system comprising: a data processor; and
    a server communicatively connected with the data processor, wherein the data processor comprises:
    a memory; and
    one or more processors configured to function as a target specifier, an allocator, a first generator, a second generator, a first transmitter, a query expression converter, a second transmitter and a first receiver, wherein the target specifier specifies, as a target for encryption and generation of an index, numerical data included in data to be managed;

the allocator allocates a first character string element included in a set of character strings to the specified numerical data, the first character string element being determined to uniquely express the specified numerical data, the set of character strings is a set of a plurality of character string elements of which magnitude correlation is uniquely identified and constructed in advance according to a collation rule;

the first generator generates the index by using the first character string element allocated to the specified numerical data;

the second generator encrypts the specified numerical data and add the index thereto to generate converted data to be managed;

the first transmitter transmits the converted data to be managed to a server;

the query expression converter converts a numerical value in a condition part of a query expression into a second character string element included in the set of character strings to generate a converted query expression;

the second transmitter transmits the converted query expression to the server; and the receiver receives, from the server, a result of query processing executed using the converted query expression, wherein the server comprises:

another memory; and one or more other processors configured to function as a second receiver, a third receiver and a query processing executor, wherein the second receiver receives the converted data to be managed from the data processor;

the third receiver receives the converted query expression from the data processor;

the query processing executor executes query processing with respect to the index included in the converted data to be managed and corresponding to the encrypted numerical value on the basis of the second character string element included in the converted query expression so that a result of the query processing is adapted to a condition part of the converted query expression; and the third transmitter transmits the result of the query processing, wherein when the target specifier specifies subsequent pieces of the numerical data representing a same numerical value, the first generator generates the index with respect to one of the subsequent pieces of the numerical data by adding a dummy character defined by the collation rule to the first character string element allocated common to the subsequent pieces of the numerical data and by replacing a character included in the first character string element allocated common to the subsequent pieces of the numerical data with an equivalent character in a magnitude correlation defined by the collation rule.

7. The system according to claim 6, wherein
the system further comprises a collation solution server that is communicatively connected with the server and is configured to perform collation processing of the magnitude correlation of the character string elements using a collation solution program generated in response to a request from the server.

8. A data processing method executed in a data processor, the method comprising:

specifying, as a target for encryption and generation of an index, numerical data included in data to be managed;

allocating a first character string element included in a set of character strings to the specified numerical data, the first character string element being determined to uniquely express the specified numerical data, the set of character strings is a set of a plurality of character string elements of which magnitude correlation is uniquely identified and constructed in advance according to a collation rule;

generating the index by using the first character string element allocated to the specified numerical data;

encrypting the specified numerical data and adding the index thereto to generate converted data to be managed;

transmitting the converted data to be managed to a server;

converting a condition part including a numerical value of a query expression into a second character string elements included in the set of character strings to generate a converted query expression;

transmitting the converted query expression to the server; and receiving, from the server, a result of query processing executed using the converted query expression, wherein the method further comprises:

performing query processing with respect to the index included in the converted data to be managed and corresponding to the encrypted numerical value on the basis of the second character string element included in the converted query expression so that a result of query processing is adapted to a condition part of the converted query expression and transmit the result to the data processor, wherein when the specifying specifies subsequent pieces of the numerical data representing a same numerical value, the generating generates the index with respect to one of the subsequent pieces of the numerical data by adding a dummy character defined by the collation rule to the first character string element allocated common to the subsequent pieces of the numerical data and by replacing a character included in the first character string element allocated common to the subsequent pieces of the numerical data with an equivalent character in a magnitude correlation defined by the collation rule.

9. A computer program product comprising a non-transitory computer-readable medium containing a programmed instruction that causes a computer to execute:

specifying, as a target for encryption and generation of an index, numerical data included in data to be managed;

allocating a first character string element included in a set of character strings to the specified numerical data to uniquely express the specified numerical data, the set of character strings is a set of a plurality of character string elements of which magnitude correlation is uniquely identified and constructed in advance according to a collation rule;

generating the index by using the first character string element allocated to the specified numerical data;

encrypting the specified numerical data and adding the index thereto to generate converted data to be managed;

transmitting the converted data to be managed to a server;

converting a numerical value in a condition part of a query expression into a second character string element included in the set of character strings to generate a converted query expression;

transmitting the converted query expression to the server; and receiving, from the server, a result of query processing, wherein the programmed instruction causes the computer to execute:

performing query processing with respect to the index included in the converted data to be managed and corresponding to the encrypted numerical value on the basis of the second character string element included in the converted query expression so that a result of the query processing is adapted to a condition part of the converted query expression and transmit the result to the data processor and transmit the result to the data processor, wherein when the specifying specifies subsequent pieces of the numerical data representing a same numerical value, the generating generates the index with respect to one of the subsequent pieces of the numerical data by adding a dummy character defined by the collation rule to the first character string element allocated common to the subsequent pieces of the numerical data and by replacing a character included in the first character string element allocated common to the subsequent pieces of the numerical data with an equivalent character in a magnitude correlation defined by the collation rule.

* * * * *